(12) United States Patent
Johnston et al.

(10) Patent No.: US 11,099,654 B2
(45) Date of Patent: *Aug. 24, 2021

(54) FACILITATE USER MANIPULATION OF A VIRTUAL REALITY ENVIRONMENT VIEW USING A COMPUTING DEVICE WITH A TOUCH SENSITIVE SURFACE

(71) Applicant: Lucasfilm Entertainment Company Ltd., San Francisco, CA (US)

(72) Inventors: Darby Johnston, Berkeley, CA (US); Ian Wakelin, Berkeley, CA (US)

(73) Assignee: LUCASFILM ENTERTAINMENT COMPANY LTD., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/852,233

(22) Filed: Apr. 17, 2020

(65) Prior Publication Data

US 2020/0249765 A1 Aug. 6, 2020

Related U.S. Application Data

(63) Continuation of application No. 14/871,611, filed on Sep. 30, 2015, now Pat. No. 10,627,908.

(Continued)

(51) Int. Cl.
| | |
|---|---|
| *G06F 3/01* | (2006.01) |
| *G06T 19/00* | (2011.01) |
| *G06F 3/0482* | (2013.01) |
| *G06F 3/0488* | (2013.01) |
| *H04N 5/232* | (2006.01) |
| *H04N 13/344* | (2018.01) |
| *H04N 13/398* | (2018.01) |

(Continued)

(52) U.S. Cl.
CPC .............. *G06F 3/017* (2013.01); *G06F 3/011* (2013.01); *G06F 3/0482* (2013.01);
(Continued)

(58) Field of Classification Search
None
See application file for complete search history.

(56) References Cited

U.S. PATENT DOCUMENTS

| 9,392,212 B1 | 7/2016 | Ross | |
|---|---|---|---|
| 2011/0205243 A1* | 8/2011 | Matsuda | ............. G06F 3/04815 345/633 |

(Continued)

OTHER PUBLICATIONS

U.S. Appl. No. 14/871,611, "Final Office Action", dated Oct. 13, 2017, 22 pages.

(Continued)

*Primary Examiner* — YuJang Tswei
(74) *Attorney, Agent, or Firm* — Kilpatrick Townsend & Stockton LLP

(57) ABSTRACT

A system and method for controlling a view of a virtual reality (VR) environment via a computing device with a touch sensitive surface are disclosed. In some examples, a user may be enabled to augment the view of the VR environment by providing finger gestures to the touch sensitive surface. In one example, the user is enabled to call up a menu in the view of the VR environment. In one example, the user is enabled to switch the view of the VR environment displayed on a device associated with another user to a new location within the VR environment. In some examples, the user may be enabled to use the computing device to control a virtual camera within the VR environment and have various information regarding one or more aspects of the virtual camera displayed in the view of the VR environment presented to the user.

21 Claims, 14 Drawing Sheets

Related U.S. Application Data

(60) Provisional application No. 62/185,422, filed on Jun. 26, 2015, provisional application No. 62/139,490, filed on Mar. 27, 2015.

(51) Int. Cl.
| | | |
|---|---|---|
| *G02B 27/01* | (2006.01) | |
| *G06F 3/041* | (2006.01) | |
| *G06T 19/20* | (2011.01) | |
| *G06F 3/0481* | (2013.01) | |

(52) U.S. Cl.
CPC ........ *G06F 3/04883* (2013.01); *G06T 19/006* (2013.01); *H04N 5/232* (2013.01); *H04N 5/23216* (2013.01); *H04N 5/23299* (2018.08); *H04N 5/232933* (2018.08); *H04N 13/344* (2018.05); *H04N 13/398* (2018.05); *G02B 27/01* (2013.01); *G06F 3/041* (2013.01); *G06F 3/04815* (2013.01); *G06T 19/20* (2013.01)

(56) References Cited

U.S. PATENT DOCUMENTS

| | | | | |
|---|---|---|---|---|
| 2012/0249741 | A1* | 10/2012 | Maciocci | ............. G06T 15/503 348/46 |
| 2013/0196772 | A1* | 8/2013 | Latta | ...................... G06Q 10/00 463/42 |
| 2014/0098132 | A1* | 4/2014 | Fein | ...................... G06T 19/006 345/633 |
| 2014/0160001 | A1 | 6/2014 | Kinnebrew et al. | |
| 2016/0054793 | A1* | 2/2016 | Kasahara | .................. G06T 5/50 345/633 |
| 2016/0217616 | A1* | 7/2016 | Kraver | .................. A63F 13/213 |
| 2016/0283081 | A1 | 9/2016 | Johnston et al. | |
| 2017/0061700 | A1* | 3/2017 | Urbach | ................ G06Q 20/123 |

OTHER PUBLICATIONS

U.S. Appl. No. 14/871,611, "Final Office Action", dated Oct. 19, 2018, 29 pages.
U.S. Appl. No. 14/871,611, "Final Office Action", dated Aug. 15, 2019, 31 pages.
U.S. Appl. No. 14/871,611, "Non-Final Office Action", dated May 1, 2017, 19 pages.
U.S. Appl. No. 14/871,611, "Non-Final Office Action", dated Mar. 8, 2018, 24 pages.
U.S. Appl. No. 14/871,611, "Non-Final Office Action", dated Apr. 2, 2019, 31 pages.
U.S. Appl. No. 14/871,611, "Notice of Allowance", dated Dec. 13, 2019, 8 pages.
Boring et al., "Touch Projector: Mobile Interaction through Video", ACM, Oct. 15, 2010, pp. 1-10.

\* cited by examiner

Press (e.g. 3 seconds)

N Tap (e.g., double tap)

N Finger Touch (e.g. 3 finger Touch)

Reverse Pinch

Rotate

FACILITATE USER MANIPULATION OF A VIRTUAL REALITY ENVIRONMENT VIEW USING A COMPUTING DEVICE WITH A TOUCH SENSITIVE SURFACE

CROSS-REFERENCE TO RELATED APPLICATIONS

This application is a continuation of U.S. application Ser. No. 14/871,611, entitled "Facilitate User Manipulation Of A Virtual Reality Environment View Using A Computing Device With Touch Sensitive Surface" filed on Sep. 30, 2015 and issued as U.S. Pat. No. 10,627,908 on Apr. 21, 2020. This application claims priority to Application No. 62/185,422, entitled "INTERACTING WITHIN AN IMMERSIVE ENVIRONMENT", filed Jun. 26, 2015, and to Application No. 62/139,490, entitled "GENERATING CONTENT BASED ON AN IMMERSIVE ENVIRONMENT", filed Mar. 27, 2015, all of which are hereby incorporated by reference, in their entirety and for all purposes.

This application is related to application Ser. No. 14/724,578, filed May 28, 2015, entitled "SWITCHING MODES OF A MEDIA CONTENT ITEM", and to application Ser. No. 14/724,558, filed May 28, 2015, entitled "NAVIGATING A VIRTUAL ENVIRONMENT OF A MEDIA CONTENT ITEM", both of which are hereby incorporated by reference, in their entirety and for all purposes.

FIELD

The present disclosure generally relates to facilitating a user to manipulate display of a view of a virtual reality environment. For example, techniques and systems can be provided for displaying a menu in a view of virtual reality or for switching a location of view for another user.

BACKGROUND

Virtual Reality (VR) systems immerse a user in a three-dimensional virtual world. Typically, the user wears a head mounted device (HMD) that presents the user views of the three-dimensional world rendered by a computing device associated with the HMD, while blocking all other visual stimulation. Traditional VR systems typically track the user's head or, as the case may be, the user's viewpoint, so that the graphics of the three-dimensional world can be rendered from the user's viewpoint. When the user changes his or her position or moves his or her head, the view of the three-dimensional virtual world displayed on the HMD is changed accordingly. Currently, however, there is no effective way of allowing a user to navigate and move objects within the three-dimensional virtual world.

BRIEF SUMMARY

In one aspect, an embodiment of the present invention is directed to facilitating a user to manipulate a virtual reality (VR) environment displayed on a mobile device, such as a head mounted display (HMD). The user can be enabled to do so through a computing device associated with the user, wherein the computing device can include a touch sensitive surface capable of receiving touches from the user. The computing device can include a smartphone, a tablet device, a laptop computer, or any other suitable computing device. The computing device can be wirelessly connected to a computing platform, e.g., a server, that renders views of the VR environment displayed on the HMD. User inputs, such as finger gestures, to the touch sensitive surface of the computing device can be received by the computing platform and can be interpreted as a control command to manipulate the view of the VR environment displayed on the HMD.

In some examples, the user may use the computing device, which can be separate from the HMD, to "call up" a menu of items for user selection in the view of the VR environment displayed on a HMD associated with the user. For example, the user may double tap the touch sensitive surface of the computing device to call up a corresponding menu of items in a view of the VR environment displayed on the HMD. The presentation of such a menu of items in the view can be based on a context of the view, such as a location of the view, a size of the field of the view, a subject matter of the view, object(s) and/or character(s) appearing in the view, and/or any other context of the view. Subsequently, the user may transmit other user input(s) to the computing platform the computing device. For example, after the menu of items is presented in the view, the user may perform a "swipe" finger gesture on the touch sensitive surface associated with the computing device to highlight a desired item in the menu, and may then perform a "single tap" figure gesture to select that item. In this way, an interactive menu system can be presented to enable the user to select desired items presented in the menu. Compared with traditional virtual reality systems described above, this way of user inputs in the VR systems has improved input accuracy. Unlike the traditional data glove, a computing device associated with a touch sensitive surface would not require much training on the user part.

In some examples, the user (first user) may use the computing device to manipulate a view displayed on a HMD associated with another (a second) user. For example, the first user may use the computing device to select a location in the VR environment where the viewpoint of the VR environment displayed on the second user's HMD can change according to the first user's input from the computing device associated with the first user. For example, the first user may perform successive finger swipes to scroll a view of the VR environment through the computing device. As a result, the view of the VR environment presented to the second user on the second user's HMD can change according to the first user's finger swipe on the computing device associated with the first user (e.g., scrolling to a view of VR environment the first user would like for the second user to view on the second user's HMD). For instance, the first user may perform a finger gesture or finger gestures on the touch sensitive surface of the computing device associated with the first user to "teleport" the view of the VR environment seen by the second user on the second user's HMD from one location in the VR environment to another location. In one embodiment, the first user is enabled to perform a single tap to teleport the view of the VR environment seen by the second user on the second user's HMD.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments can be practiced without the specific details. Furthermore, well-known features may be omitted or simplified in order not to obscure the embodiment being described.

Figure 1:
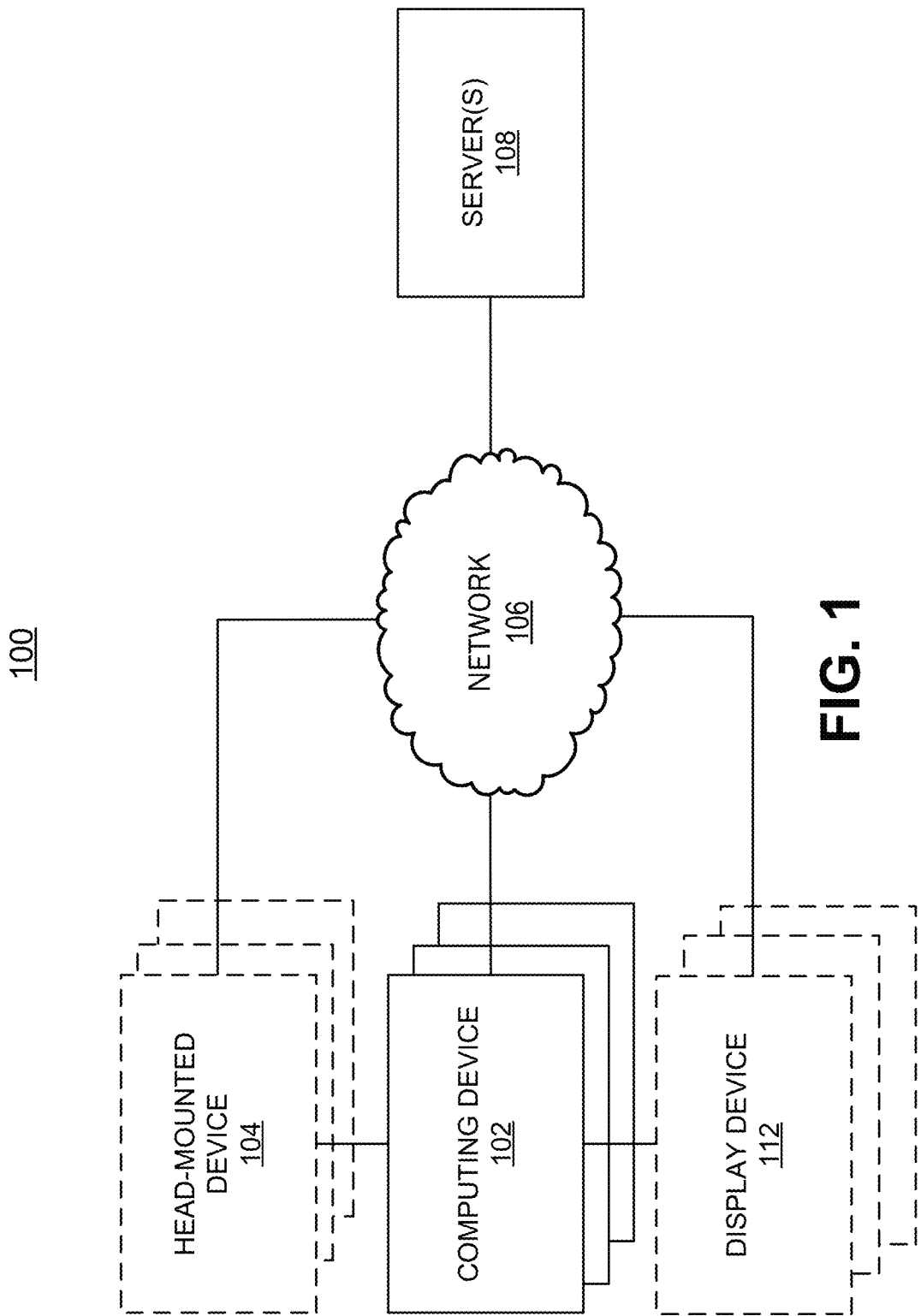
FIG. 1 is a diagram generally illustrating an architecture of a system for facilitating a user to manipulate a view of a VR environment in accordance with the present disclosure.

FIG. 1 illustrates an example of a system 100 that can render a view of a virtual reality (VR) environment for display on a head-mounted device (HMD) associated with a user. As shown, the system 100 may include a server or servers 108 (e.g., one or more server computers) that is configured to and that may communicate with, provide content to, and/or control one or more interactive devices. The one or more interactive devices may include one or more computing devices 102, one or more head-mounted devices 104, one or more display device 112, or other suitable interactive device(s).

The server 108 can be configured to implemented an instance of the VR environment and to determine view information defining views of the VR environment. The view information determined by the server 108 can be communicated (e.g., via streaming, via object/position data, and/or other information) from server 108 to the interactive devices for presentation to users. The view information determined and transmitted to the interactive devices may correspond to a location in the VR environment (e.g., the location from which the view is taken, the location the view depicts, and/or other locations), a zoom ratio, a dimensionality of objects, a point-of-view, and/or view parameters. One or more of the view parameters can be selectable by the user.

The instance of the VR environment can include a simulated space that is accessible by a user via the interactive devices which may present the views of the VR environment to the user. For example, the views of the VR environment can be presented to the user via a display coupled to the interactive devices or can be presented to the user directly on the interactive devices. The simulated space can have a topography, express ongoing real-time interaction by one or more users, and/or include one or more objects positioned within the topography that are capable of locomotion within the topography. The topography can be a 3-dimensional topography. The topography can include dimensions of the space, and/or surface features of a surface or objects that are "native" to the space. In some instances, the topography can describe a surface (e.g., a ground surface) that runs through at least a substantial portion of the space. In some instances, the topography can describe a volume with one or more bodies positioned therein (e.g., a simulation of gravity-deprived space with one or more celestial bodies positioned therein).

The above description of the manner in which views of the VR environment are determined by the server 108 is not intended to be limiting. Server 108 can be configured to express the VR environment in a more limited, or more rich, manner. For example, views determined for the VR environment can be selected from a limited set of graphics depicting an event in a given place within the VR environment. The views can include additional content (e.g., text, audio, pre-stored video content, and/or other content) that describes particulars of the current state of the place, beyond the relatively generic graphics.

The server 108 can communicate the view information with the interactive devices in a client/server architecture via a network 106 as shown. In some embodiments, the network 106 may include one or more cloud infrastructure systems that provide cloud services. A cloud infrastructure system may, for example, be operated by a service provider. In some aspects, services provided by the cloud network may include a host of services that are made available to users of the cloud infrastructure system on demand, such as remote rendering of media content. Services provided by the cloud infrastructure system can dynamically scale to meet the needs of its users. However, this is not intended to be limiting. In some examples, the network 106 can comprise a wired network, a wireless network or a combination of both.

The network 106 can include one or more computers, servers, and/or systems, including the server 108. In some embodiments, the computers, servers, and/or systems making up the network 106 are different from a customer's on-premises computers, servers, and/or systems. For example, the network 106 can host an application, and a user or customer may order and use the application via a communication network (e.g., network 106). In some examples, the network 106 may host a Network Address Translation (NAT) Traversal application to establish a secure connection between a service provider of the network and one or more of the interactive devices, such as the computing device 102, head-mounted device 104, or display device 112. A separate secure Transmission Control Protocol (TCP) connection can be established by each interactive device for communicating between each interactive device and the server 108 (or other server) of the cloud network. In some embodiments, each secure connection can be kept open for an indefinite period of time so that the cloud network can initiate communications with each respective interactive device at any time. Various protocols can be used to establish a secure connection between each network device and the server 108, including Session Traversal Utilities for NAT (STUN), Traversal Using Relay NAT (TURN), Interactive Connectivity Establishment (ICE), a combination thereof, or any other appropriate NAT traversal protocol.

In some cases, communications between the network 106 and interactive devices can be supported using other types of communication protocols. Such protocols may include a Hypertext Transfer Protocol (HTTP) protocol, a Hypertext Transfer Protocol Secure (HTTPS) protocol, or other suitable communication protocol. In certain embodiments, the cloud network may include a suite of applications, middleware, and database service offerings that are delivered to a customer in a self-service, subscription-based, elastically scalable, reliable, highly available, and secure manner.

The server 108 can receive a user request for displaying a view of the VR environment, from an interactive device (e.g., computing device 102, head-mounted device 104, or display device 112 shown in FIG. 1), on the interactive device from which the user request originates or on another interactive device. For example, a user input can be received from the computing device 102 for displaying a view of the VR environment on a head-mounted device 104 associated with the user. Upon receiving such a request, the server 108 can provide appropriate view information to the interactive device (or another interactive device) by rendering one or more images representing a view requested by the user and sending the rendered images to the interactive device (or another interactive device). In implementations, the server 108 can include hardware and software for a rendering algorithm to rendering such images. The rendering algorithm can utilize one or more scene files that contain objects in a defined language or data structure. For example, the scene file may include a description of the virtual scene that includes geometries, viewpoints, textures, lighting, and shading information of different virtual environments, virtual backgrounds, and virtual objects in the scene. Any suitable rendering algorithm can be used to process the scene file to render the images of the view requested by the user. In some examples, a rendering algorithm may use one or more of rasterization techniques, ray casting techniques, ray tracing techniques, radiosity techniques, or other suitable techniques for rendering an image. In one example, the rendering algorithm used by the server 108 may include rasterization with deferred shading and dynamic global illumination. In some embodiments, the server 108 may include a graphics processing unit (GPU) in addition to a central processing unit (CPU) for rendering the images of the media content item 110.

In some examples, an interactive device can include a computing device 102. The computing device 102 can include a mobile phone, a tablet device, a laptop computer, a television or other display device, a digital video recording device, a set-top box device, or any other suitable computing device 102. The computing device 102 can be associated with a touch sensitive surface capable of sensing touches by a user. The touch sensitive surface included in the computing device 102 may include a tactile sensor that can translate the motion and position of the user's fingers to a relative position mapped to a display of the computing device 102. Examples of the touch sensitive surface may include a touch sensitive display, a touchpad, or any other touch sensitive surface.

In some examples, an interactive device may include a head-mounted device 104. For example, the head-mounted device 104 may include a head-mounted virtual reality device, such as virtual reality goggles or glasses. In another example, the head-mounted device 104 may include three-dimensional glasses. In some examples, an interactive device may include a display device 112. For example, the display device 112 may include a television, a desktop or laptop computer, an immersion system or cave, or other suitable display device.

In some examples, an interactive device may include a display device 112. For example, the display device 112 may include a television, a projection screen, a LCD/OLED wall, or any other display device. The display device 112 can be used to present one or more views displayed on the HMDs 104 and/or computing devices 102.

Figure 2:
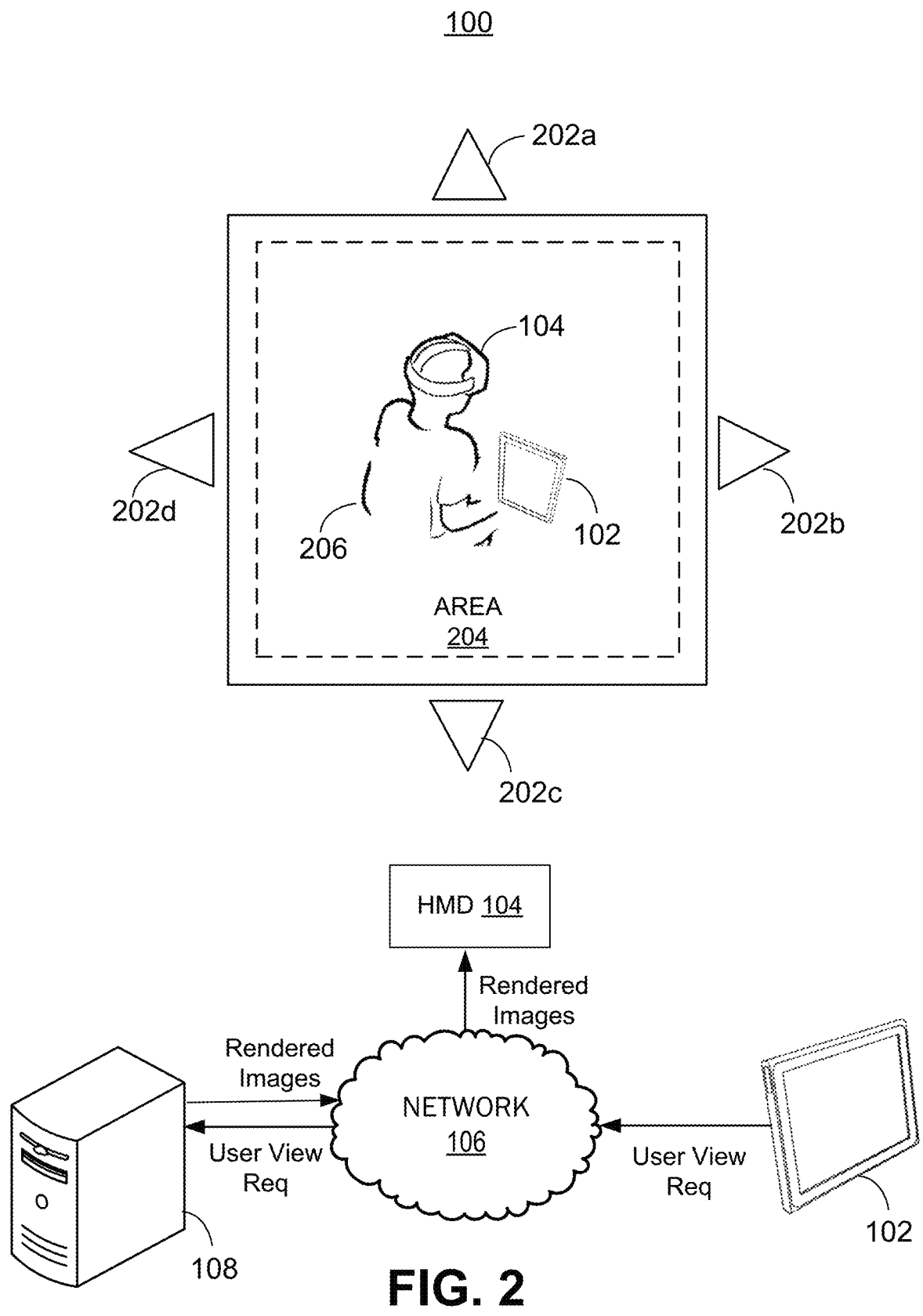
FIG. 2 illustrates an example of the system shown in FIG. 1 for facilitating a user to manipulate a view of a VR environment.

With the general architecture of the system 100 for facilitating a user to manipulate a view of a VR environment having been described, attention is now directed to embodiments of the system 100 with an emphasis on receiving user inputs for the view manipulation. FIG. 2 illustrates an example of the system 100 for facilitating a user to manipulate a view of a VR environment. As shown in FIG. 2, the system 100 can include one or more sensors 202, such as sensors 202a-d shown, located in the area 204. The sensors 202 can include, for example, cameras, depth sensors, infra-red sensors, light sensors, or other suitable sensors. The sensors 202 can be used to track the movement and positioning of a user 206 within the area 204. As shown, the user 206 may wear a HMD 104 and control the computing device 102 at the same time. However, this is not intended to be limiting. It should be understood the user 206 is not required to wear HMD 104 to manipulate a view of the VR environment for display via the computing device 102. In some other examples, the user 206 may use the computing device 102 to manipulate a view of the VR environment displayed on another user's HMD 104.

In some examples, the system 100 may establish a communication link with one or more interactive devices, such as the computing device 102 shown, in proximity to the system 100. For example, the system may establish a Bluetooth™ link, a Zigbee™ link, or other communication link with the computing device 102 located within the area 204. Following establishment of the communication link, the system 100 may receive a request from the user 206 for a particular view of the VR environment to be presented on the HMD 104.

Upon receiving the user request for the particular view, the server 108 can render one or more images representing the particular view. The server 108 can send the rendered to the interactive devices, such as the computing device 102, HMD 104, and the display device 112 shown in FIG. 1, for presentation. In some embodiments, the computing device 102 can provide height information for the user 206. Using the height information, the server 108 can adjust the height of assets or objects rendered for in the particular view. For example, if a particular user were 6'5, the server 108 can adjust a particular character in the particular view to also be 6'5. In one aspect, assets can be downloaded from the interactive device, from local storage of the system, or from a repository available over the Internet.

The system 100 can be used in several different applications. For example, without limitation, a director c use the may immersive experience provided by the system 100 to prepare for an animation feature from the VR environment implemented by the server 108. For example, the director may use the computing device 102 to provide inputs the set dress one or more scenes to be used in the animation feature, to set placement of one or more virtual cameras for the animation features, to make notes about certain objects, characters, locations, or any other aspects about the VR environment, or for any other purpose. As another example, an actor may use the immersive experience provided by the system 100 to aid in his or her acting performance (e.g., maintain eye level with a digital character). Still as another example, the immersive experience can be used by a movie viewer to be immersed within a customized movie based on the movie viewer's personal preferences using, for example, one or more of the interactive options. Illustratively, the user may prefer that a particular movie occur within a beach environment as opposed to a mountainous environment. As yet another example, a video game user may control a 3D holographic character within an immersive environment and interact with other assets in the immersive environment.

Figure 3:
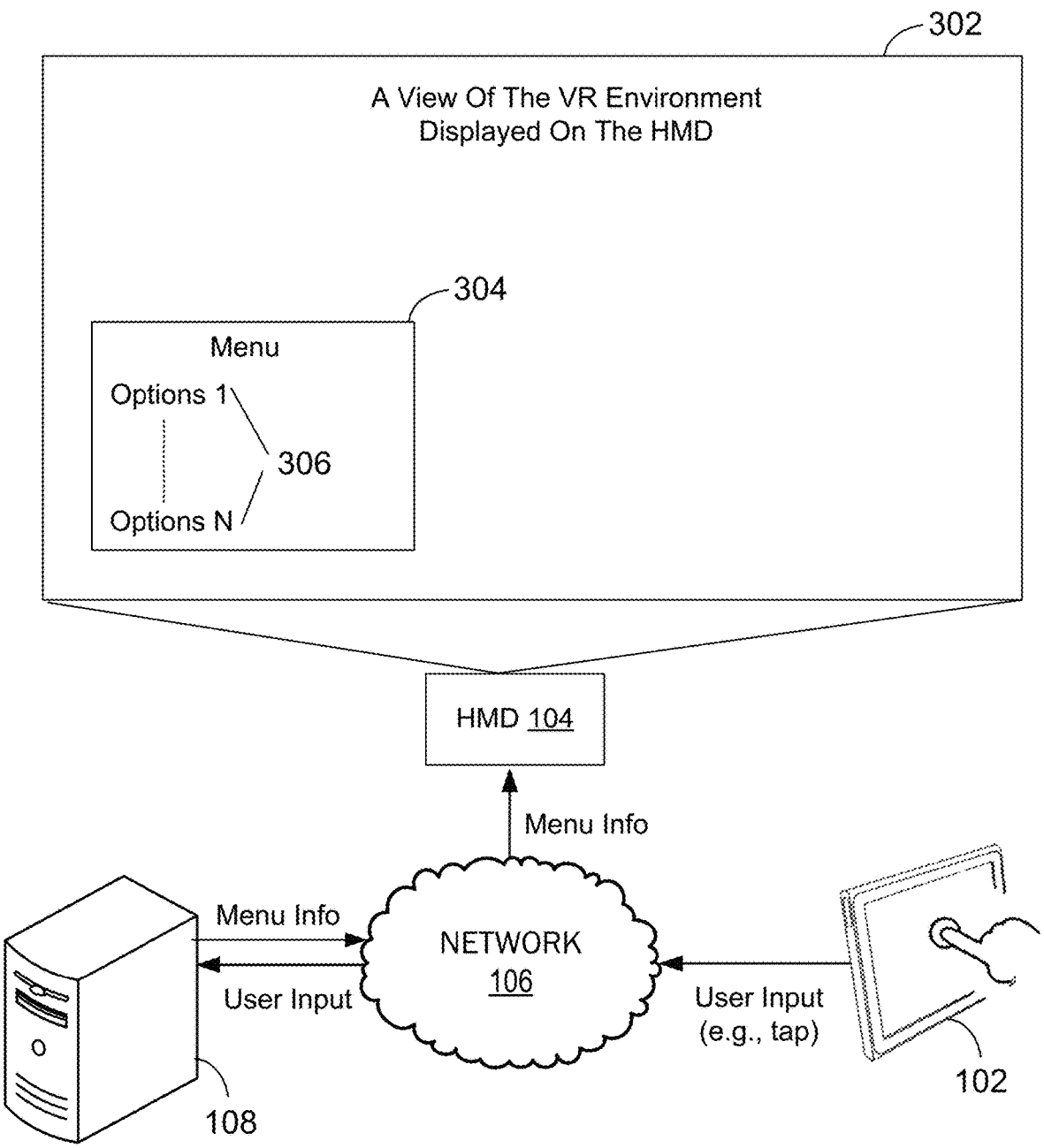
FIG. 3 illustrates another example of system shown in FIG. 1.

FIG. 3 illustrates another example of system 100. As shown in this example, a menu 304 for user to select one or more options related to manipulation of the VR environment can be presented in a view 302 displayed on a HMD 104. As shown, the user may be enabled to provide an input to the computing device 102 via the touch sensitive surface included in the computing device 102. For example, as shown in this example, the user may tap the touch sensitive surface of the computing device to provide such a input. As shown, the input provided by the user can be transmitted to the server 108 via the network 106. The server 108 can be configured to translate such a user input and map the user input to a control command that specifies a selectable menu of items (or options as illustrated) can be presented on the HMD 104 in the view currently being displayed on the HMD 104. In some examples, the server 108 can be configured to determine the content (e.g., the included options) of the menu, the design or layout of the menu, the location of presentation of the menu in the view and/or any other aspects related to presenting such a menu based on the view currently being displayed on the HMD 104. For example, without limitation, if the current view includes one or more virtual objects, the menu can be determined by the server 108 to include options for the user to manipulate the virtual objects. As another example, without limitation, if the current view has a large space at bottom left without any virtual objects or characters, the menu can be determined by the server 108 to be presented at that location in the view. Other examples are contemplated.

As shown, once various aspects regarding the presentation of the menu having been determined by the server 108, information regarding generating the menu in accordance with the determined aspects (menu information as illustrated in FIG. 3) can be transmitted to the HMD 104. Once receiving the menu information from the server 108, the HMD 104 may generate the menu, such as the menu 304, accordingly and present it in the view 302 that is being currently display on the HMD 104. As shown, the menu 304 may include one or more user selectable options 306, each of which may correspond to a control command or control commands for manipulating the VR environment, or may correspond to a sub-menu of selectable options for further user selections. In some examples, the menu 304 can be presented in the view 302 transparently or semi-transparently; and in some other examples, the menu 304 can be presented in the view 302 as an opaque area such that a portion of the view 302 is blocked by menu 304.

Figure 4:
FIG. 4 illustrates some examples of finger gestures that can be performed by the user as control signals to augment the view as illustrated in FIG. 3.
Figure 4:
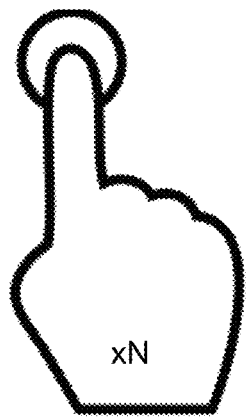
Figure 4:
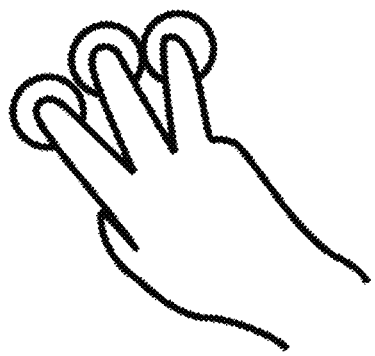
Figure 4:
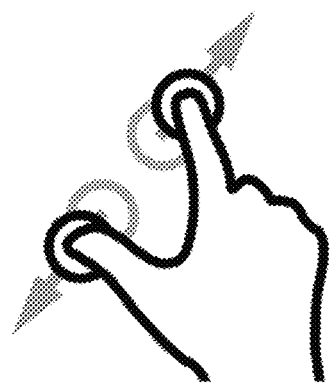
Figure 4:
Figure 4:
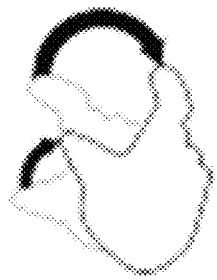
Figure 4:
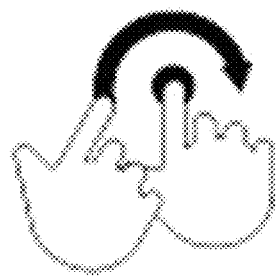

FIG. 4 illustrates some examples of finger gestures that may be performed by the user as control signals to augment the view as illustrated in FIG. 3. As shown, various finger gestures may be provided by the user via the touch sensitive surface associated with the computing device 102, such as press for n number of seconds (e.g., press for 3 seconds), n tap (e.g., double tap), n finger touch (e.g., 3 finger touch), reverse pinch, finger rotating, or any other finger gestures. It should be understood the examples of finger gestures shown in FIG. 4 are merely for illustration, and thus are not intended to be limiting. Other finger gestures, such as swipe in various directions, can be used. In some examples, the control signal for calling up the menu in the view currently being displayed on the HMD may involve a combination of one or more of the finger gestures shown in FIG. 4.

Figure 5:
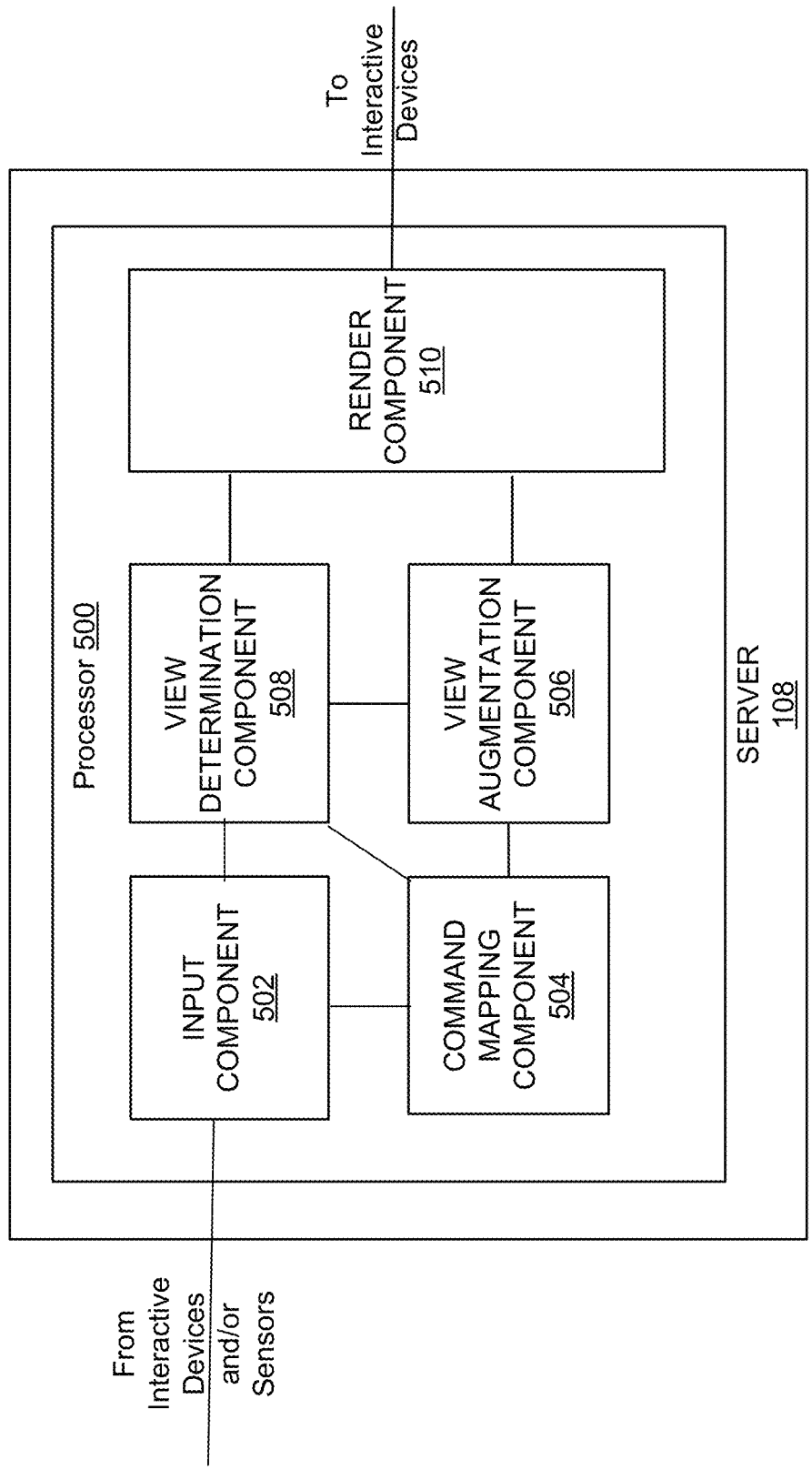
FIG. 5 illustrates one exemplary implementation of server 108 in accordance with one embodiment of the disclosure.

FIG. 5 illustrates one exemplary implementation of server 108 in accordance with one embodiment of the disclosure. It will be described with reference to FIG. 1. As shown, the server 108 may comprise one or more of a processor 500. The processor 500 may comprise a input component 502, a command mapping component 504, a view augmentation component 506, a view determination component 508, a render component 510, and/or any other components. The input component 502 can be configured to receive inputs provided through the interactive devices shown in FIG. 1, such as the computing device 102, the HMD 104, the display device 112, and/or the sensors 202. For example, the input component 502 may receive user inputs provided through the touch sensitive surface associated with the computing device 102. After receiving the inputs, the input component 502 may translate the inputs. For example, in some embodiments, some inputs received by the input component 502 can be encoded signals. In those embodiments, the component 502 may translate the received inputs according to one or more tables configured into user input component 502.

The command mapping component 504 can be configured to map the inputs received by the input component 502 to corresponding control commands according to one or more mapping rules configured into the command mapping component 504. For example, the finger gesture inputs shown in FIG. 4 can be mapped to a control command to call up a menu in the view currently being displayed on the HMD 104. As another example, without limitation, the user inputs received by the input component 502 can be a swiping gesture for selecting a desired option in the menu presented in the view. In that example, the command mapping component 504 may map such user inputs to a "select" command for selecting the desired option, which may in turn correspond to another control command or a sub-menu to be presented on top of the menu presented in the view.

The view determination component 508 can be configured to determine views of the VR environment for display on the HMD 104. As described above, a view of the VR environment may correspond to a location in the VR environment and can be determined by the view determination component 508 based on the inputs received by the input component 502 (user movement information from the sensors 202, inputs provided by the user through the computing device 102 and/or any other inputs) and/or the control command mapped by the command mapping component 504. The view determination component 508 can be configured to generate view information.

The view augmentation component 506 can be configured to augment a view of the VR environment determined by the view determination component 508 in response to a control command mapped from inputs received by the input component 502. For example, the view augmentation component 506 can be configured to augment a view by presenting a menu, such as the menu 304 shown in FIG. 3, in the view, in response to a finger gesture (e.g., a double tap) received from the computing device 102. As another example, the view augmentation component 506 can be configured to augment a view by presenting a sub-menu in the view, in response to user inputs that select a desired option in the menu already presented in the view. The view augmentation component 506 can be configured to generate view augmentation information for augmenting a view determined by the view determination component 508. The augmentation information generated by the view augmentation component 506 may include menu information for presenting a menu in the view determined by the view determination component 508.

The render component 510 can be configured to render one or more images representing a view determined by the communication component 510 and may modify the rendered images with the view augmentation information received from the view augmentation component 506. For example, without limitation, the render component 510 can render multiple images representing a 360 degree view of the VR environment from a viewpoint corresponding to the user's position in the area 204 shown in FIG. 2. In that example, view augmentation such as a menu can be generated by the view augmentation component 506 and can be rendered on to one or more of the images for presentation.

Figure 6:
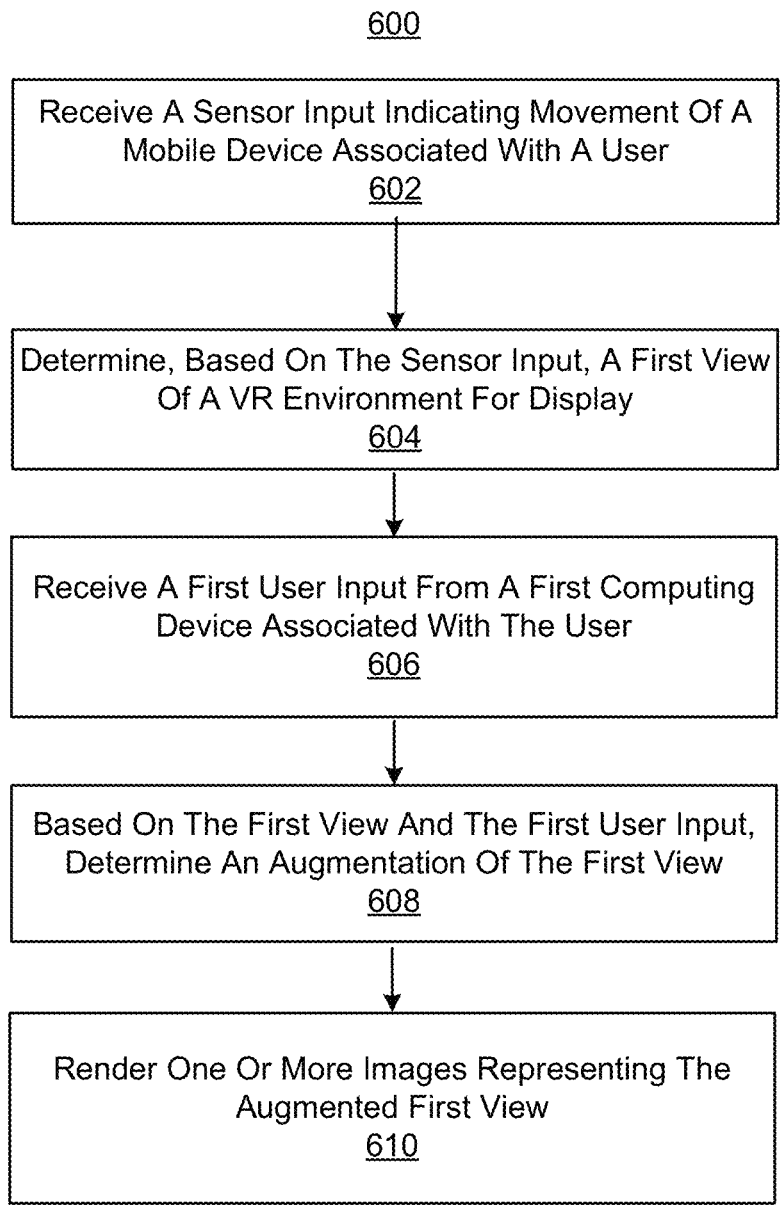
FIG. 6 illustrates an example of a process for augmenting a view of an VR environment based on user inputs.

FIG. 6 illustrates an example of a process 600 for augmenting a view of an VR environment based on user inputs. Process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 can be performed under the control of one or more computer systems configured with executable instructions and can be implemented as code (e.g., executable instructions, one or more computer programs, or one or more applications) executing collectively on one or more processors, by hardware, or combinations thereof. The code can be stored on a computer-readable storage medium, for example, in the form of a computer program comprising a plurality of instructions executable by one or more processors. The computer-readable storage medium can be non-transitory.

In some aspects, the process 600 can be performed by one or more of a server, such as server 108 described and illustrated herein.

At 602, a sensor input indicating movement a mobile device associated with a user can be received. The mobile device may include a computing device, such as the computing device 102, a HMD, such as the HMD 104, a display device, such as the display device 112, or any other mobile device. In some examples, as in the example illustrated in FIG. 2, the sensor input received at 602 indicates user position change(s) within an area, such as the area 204 shown, monitored by one or more sensors, such as the sensors 202a-d. In some examples, 602 can be performed by a input component the same as or substantially similar to the input component 502 described and illustrated herein.

At 604, a first view of a VR environment can be determined based on the sensor input received at 602. Determination of the first view may involve determining a location in the VR environment where the first view is taken (e.g., the view point), a size of the field of the view, a zoom ration of the view, a lens type for presenting the view, and/or any other aspects for determining the first view. The first view can be determined based on the user movement information indicated by the sensor input. For example, if the user movement information indicates the user has moved within the area 204 from location A to location B, the location of the first view can be determined to correspond to the user movement within the area 204 according. In some examples, 604 can be performed by a view determination component the same as or substantially similar to the view determination component 508 described and illustrated herein.

At 606, a first user input can be received from a first computing device associated with the user. The first computing device may include a touch sensitive surface and the first user input can be provided by the user via the touch sensitive surface. In some examples, the first input may include one or more of a finger gesture, such as the ones shown in FIG. 4, provided by the user via the touch sensitive surface of the first computing device associated with the user. In some examples, 606 can be performed by a input component 502 the same as or substantially similar to the input component 502 described and illustrated herein.

At 608, an augmentation of the first view determined at 604 can be made based on the first user input received at 604 and the first view itself. The view augmentation may include presenting additional information in the first view, modify the first view in accordance with or at the instruction of the first user input, change the location of the first view, and/or any other view augmentation. In some examples, 608 can be performed by a view augmentation component 506 the same as or substantially similar to the view augmentation component 506 described and illustrated herein.

Figure 7:
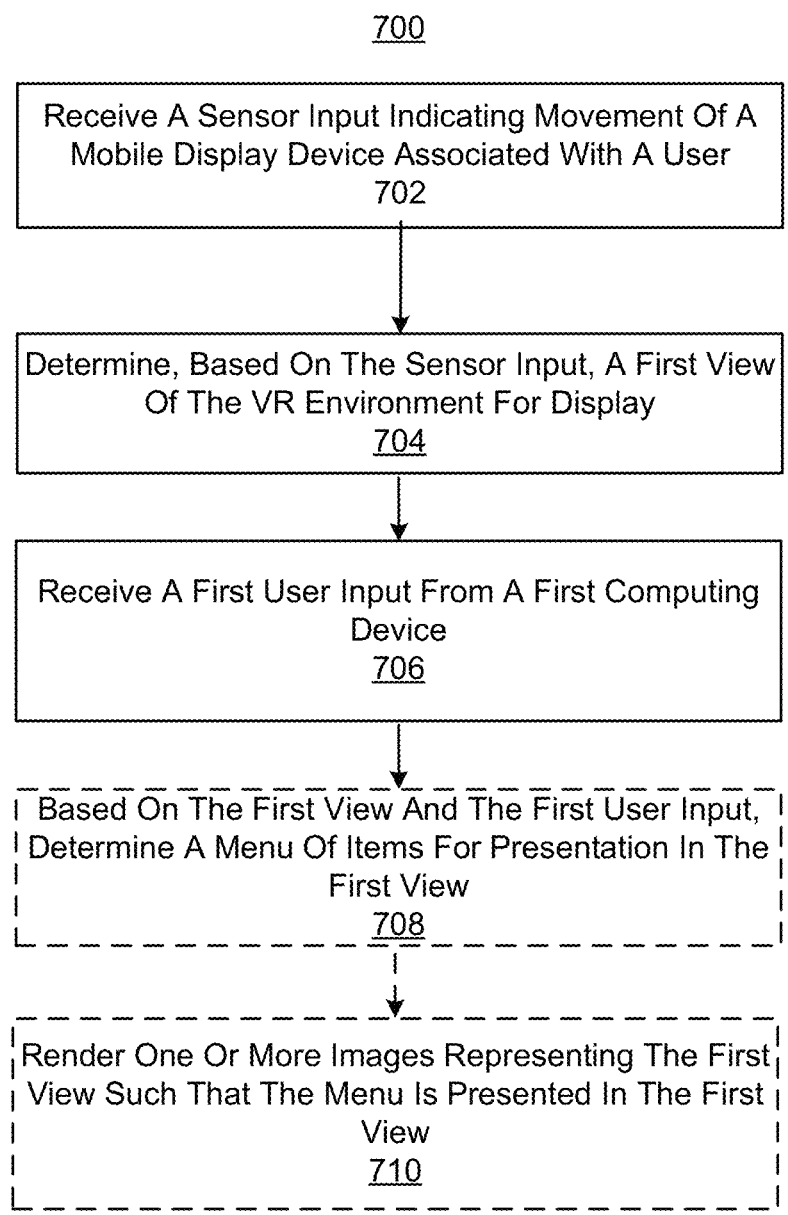
FIG. 7 illustrates an example of a process for presenting a menu of items for user selections in a view of an VR environment based on user inputs.

At 610, one or more images representing the augmented first view determined at 608 can be rendered. In some examples, 610 can be performed by performed by a render component the same as or substantially similar to the render component 510 described and illustrated herein FIG. 7 illustrates an example of a process 700 for presenting a menu of items for user selections in a view of an VR environment based on user inputs. Process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 can be performed under the control of one or more computer systems configured with executable instructions and can be implemented as code (e.g., executable instructions, one or more computer programs, or one or more applications) executing collectively on one or more processors, by hardware, or combinations thereof. The code can be stored on a computer-readable storage medium, for example, in the form of a computer program comprising a plurality of instructions executable by one or more processors. The computer-readable storage medium can be non-transitory.

In some aspects, the process 700 can be performed by one or more of a server, such as server 108 described and illustrated herein.

At 702, a sensor input indicating movement a mobile device associated with a user can be received. The mobile device may include a computing device, such as the computing device 102, a HMD, such as the HMD 104, a display device, such as the display device 107, or any other mobile device. In some examples, as in the example illustrated in FIG. 2, the sensor input received at 702 indicates user position change(s) within an area, such as the area 204 shown, monitored by one or more sensors, such as the sensors 202a-d. In some examples, 702 can be performed by a input component the same as or substantially similar to the input component 502 described and illustrated herein.

At 704, a first view of a VR environment can be determined based on the sensor input received at 702. Determination of the first view may involve determining a location in the VR environment where the first view is taken (e.g., the view point), a size of the field of the view, a zoom ration of the view, a lens type for presenting the view, and/or any other aspects for determining the first view. The first view can be determined based on the user movement information indicated by the sensor input. For example, if the user movement information indicates the user has moved within the area 204 from location A to location B, the location of the first view can be determined to correspond to the user movement within the area 204 according. In some examples, 704 can be performed by a view determination component the same as or substantially similar to the view determination component 508 described and illustrated herein.

At 706, a first user input can be received from a first computing device associated with the user. The first computing device may include a touch sensitive surface and the first user input can be provided by the user via the touch sensitive surface. In some examples, the first user input may include one or more of a finger gesture, such as the ones shown in FIG. 4, provided by the user via the touch sensitive surface of the first computing device associated with the user. For example, the first user input may include a double tap by the user on the touch sensitive surface of the computing device 102. In some examples, 706 can be performed by a input component the same as or substantially similar to the input component 502 described and illustrated herein.

At 708, based on the first view and first user input, a menu of items can be determined for presentation in the first view. In some examples, operations performed at 708 may involve determining the content (e.g., the included options) of the menu, the design or layout of the menu, the location of presentation of the menu in the view and/or any other aspects related to presenting such a menu based on the view currently being displayed on the HMD 104. For example, based on the first input, a menu type can be determined: as illustration, without limitation, if the first user input is a single tap, a first menu type can be determined (e.g., settings menu), if the first user input is a double tap, a second menu type can be determined (e.g., an annotation menu for annotating different objects in the first view), if the first user input is a triple tap, a third menu type can be determined (e.g., a lens menu for selecting different lens to be applied to the virtual camera placed at the view point), or any other type of menu can be determined based on any other first input(s). As another example, without limitation, if the first view includes one or more virtual objects, the menu determined at 708 may include options for the user to manipulate those virtual objects. In some examples, 708 can be performed by a input component the same as or substantially similar to the input component 502 described and illustrated herein.

Figure 8:
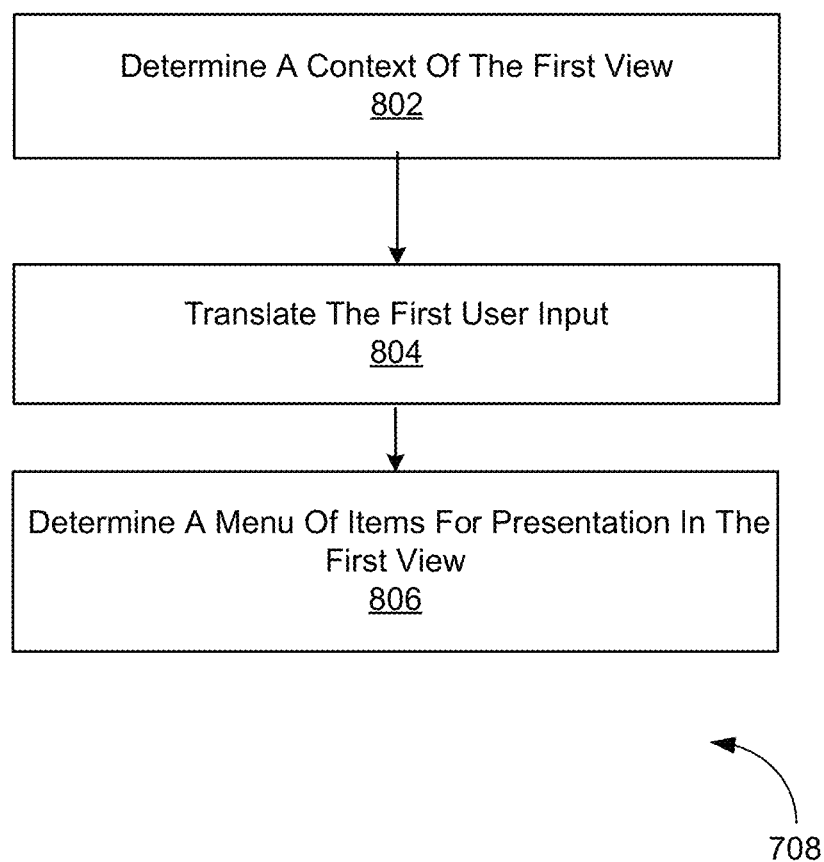
FIG. 8 illustrates an exemplary implementation of a portion of the process shown in FIG. 7 in accordance with one embodiment of the disclosure.

FIG. 8 illustrates an exemplary implementation of 708 in accordance with one embodiment of the disclosure. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process shown in FIG. 8 can be performed under the control of one or more computer systems configured with executable instructions and can be implemented as code (e.g., executable instructions, one or more computer programs, or one or more applications) executing collectively on one or more processors, by hardware, or combinations thereof. The code can be stored on a computer-readable storage medium, for example, in the form of a computer program comprising a plurality of instructions executable by one or more processors. The computer-readable storage medium can be non-transitory.

Additionally, the process shown in FIG. 8 can be performed under the control of one or more computer systems configured with executable instructions and can be implemented as code (e.g., executable instructions, one or more computer programs, or one or more applications) executing collectively on one or more processors, by hardware, or combinations thereof. The code can be stored on a computer-readable storage medium, for example, in the form of a computer program comprising a plurality of instructions executable by one or more processors. The computer-readable storage medium can be non-transitory.

At 802, a context of the first view can be determined. The context of the first view determined at 802 may include a location of the VR environment where the first view is taken, a size of a field of the first view at that location, lighting in the first view, a viewing angle, lens(es) through which the first view is seen, one or more virtual objects and/or characters in the first view, one or more events taking place (or having taken place) in the location of the VR environment where the first view is taken, and/or any other context(s) related to the first view. In some examples, 802 can be performed by a view augmentation component the same as or substantially similar to the view augmentation component 506 described and illustrated herein.

At 804, the first user input can be translated to one or more menu types. The finger gestures from the user may correspond to different types of menu types. For example, a single tap may correspond to a settings menu, a double tap may correspond to an annotation menu, a triple tap may correspond to a lens selection menu, and other finger gestures from the user may correspond to other menu types. In some examples, 804 can be performed by a view augmentation component the same as or substantially similar to the view augmentation component 506 described and illustrated herein.

At 806, a menu of items can be determined for presentation in the first view can be determined based on the context of the first view as determined at 802, and/or the menu types as determined at 804. In some examples, 806 can be performed by a view augmentation component the same as or substantially similar to the view augmentation component 506 described and illustrated herein.

Figure 9A:
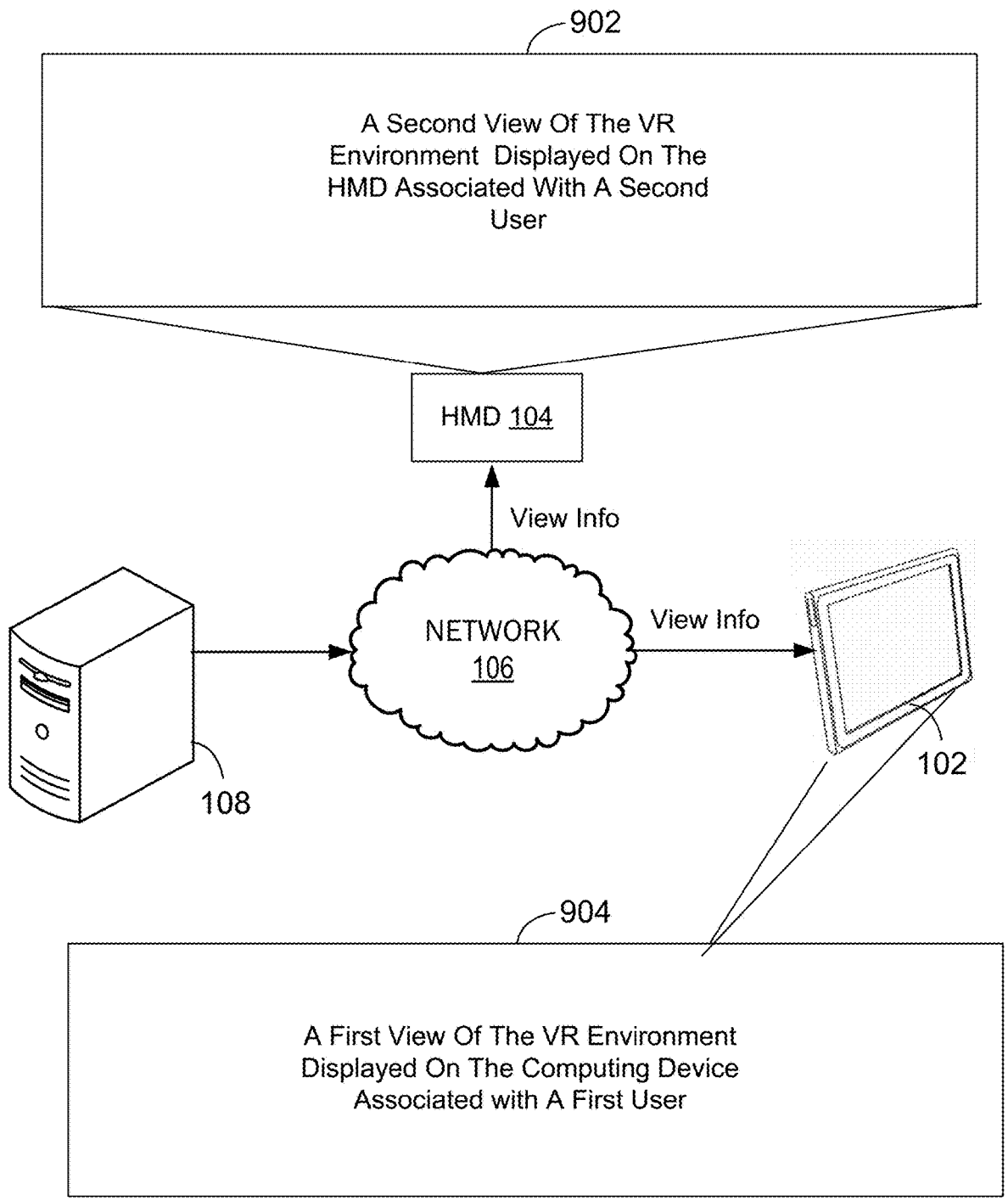
FIGS. 9A-B illustrate another example of manipulating a view of the VR environment based on the user inputs in accordance with the disclosure.
Figure 9B:
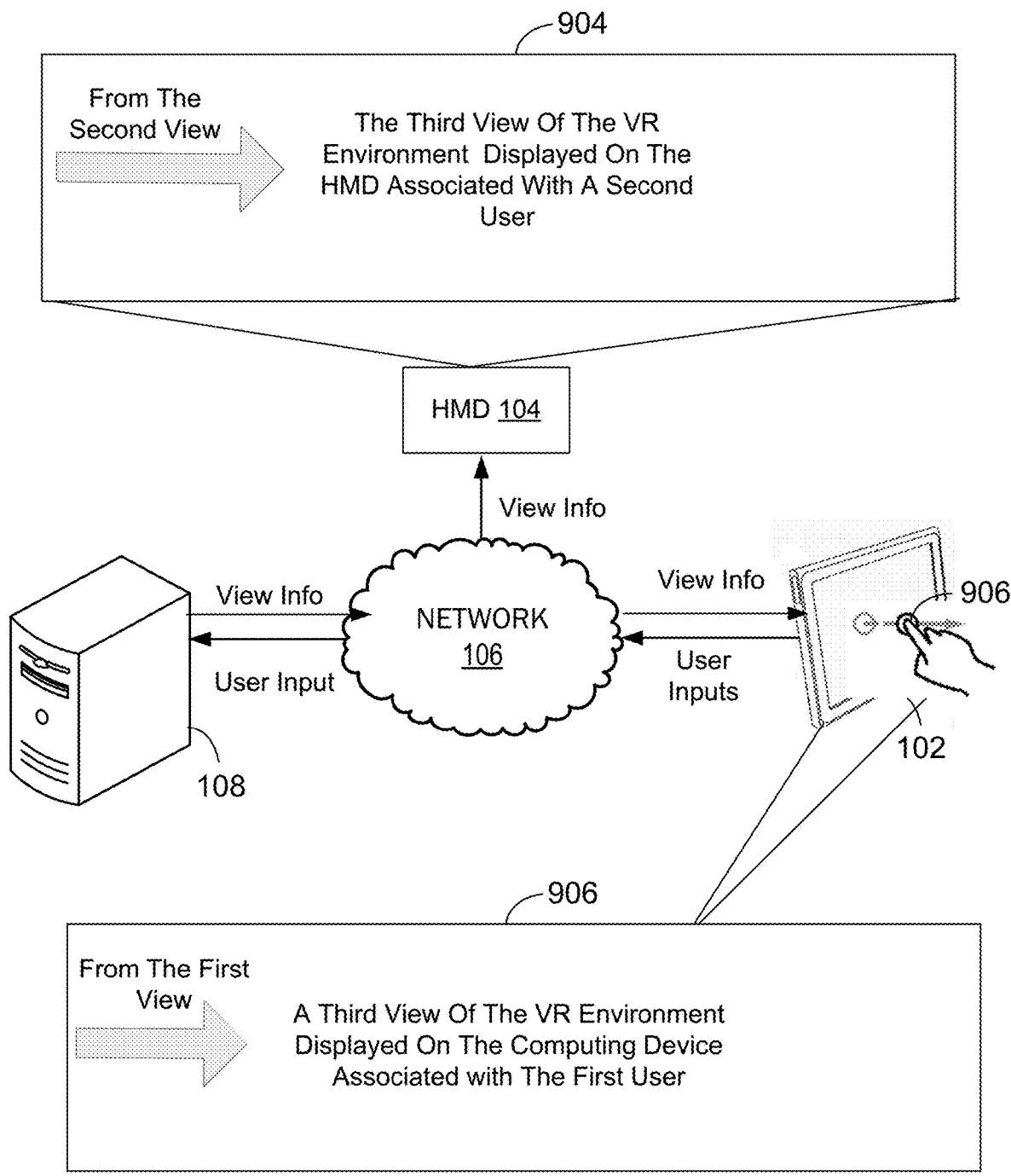

FIGS. 9A-B illustrate another example of manipulating a view of the VR environment based on the user inputs in accordance with the disclosure. As shown in FIG. 9A, at time T, the server 108 may determine a first view of the VR environment for display on a computing device 102 associated with a first user; and may determine a second view of the VR environment for display on a HMD 104 associated with a second user. As shown in FIG. 9B, at time T+1, an input 906 provided by the first user can be received from the computing device 102 via the touch sensitive surface associated with the computing device 102. As shown in this example, the input 906 can include a swipe gesture and a press gesture. The swipe gesture can be used by the first user to indicate the location of the view of the VR environment displayed on the computing device 102 should move to a new location in the VR environment, which corresponds to third view of the VR environment in this example. The press gesture can be used by the first user to indicate that the view taken at the new location (e.g., the third view of the VR environment) should be shared to the second user.

Once the server 108 receives such an input or inputs, the sever 108 can be configured to render one or more images representing the third view of the VR environment and transmit the rendered image (view information) to the HMD 104 (associated with the second user) and as well as the computing device 102 (associated with the first user). As still shown, as a result, the current displayed view on the computing device 102 may change from the first view to the third view. In some examples, such a view change on the computing device 102 may take place in a panning mode. Likewise, the current displayed view on the HMD 104 may change from the second view to the third view. In some examples, such a view change on the HMD 104 may take place in a panning mode. In those examples, the speed of the view change on the HMD 104 can be based on the speed of the user finger gesture (e.g., swipe) on the touch sensitive surface of the computing device 102. In some other examples, such a view change on the HMD 104 may take place in a "teleport" mode such that the currently displayed view on the HMD 104 may change from the second view to the third view instantly or nearly instantly in response to the finger gesture(s) provided by the first user via the computing device 102.

The example shown in FIGS. 9A-B may be useful in a number of situations. For example, in one situation, the first user is a director of an animation feature, while the second user is a voice actor for the animation feature. In that situation, the director may use the computing device 102 to find a location of the VR environment and "point" that to the voice actor by sharing it on the HMD 104 associated with the voice actor. As illustration, in another situation, the first user and second user may belong to a game group that participates in a game held within the VR environment. In that situation, the first user may "teleport" the second user to a new location of the VR environment by providing the finger gesture(s) 906 through the computing device 102. Other examples are contemplated.

Returning to FIG. 2, in some examples, user 206 of the first mobile device may interact with the computing device 102 to move a virtual camera around the VR environment. In one aspect, the virtual camera may be controlled by using one or more gestures input directly to a touchscreen of the computing device 102. For example, the user may input a swipe gesture with a single finger to pan or tilt the virtual camera according to the direction of the swipe. The user 206 may furthermore input a swipe gesture with two fingers to move the camera according to the direction of the swipe. The user may moreover input a pinch gesture to "dolly" the virtual camera. In another aspect, the virtual camera may be controlled by physically changing the position of the computing device 102 and/or changing the orientation of the computing device 102. For example, user 206 may move forward 2 feet from his or her current location while holding the computing device 206. The computing device 102 may detect such movement based one or more sensors of the computing device 102 (e.g., an accelerometer, gyroscope, GPS, depth sensor, camera, wireless radio, etc.). The information regarding the detected movement may be transmitted to server 108 which may in response shift the virtual camera and transmit image frames to the computing device 102 with the virtual camera having moved forward 2 virtual feet in the virtual environment.

In some examples, an interface can be displayed on the computing device 102 and/or HMD 104. In those examples, the user interface may include indicators (e.g. text, icons or buttons) regarding various settings for a virtual camera configured to take views of the VR environment. For example, the user interface may display the current height, location, and orientation of the virtual camera. The user interface may also display information regarding the focus, crop-factor/aspect ratio, f-stop, and/or lens type of the virtual camera. In some embodiments, the user may interact with the indicators and/or the computing device 102 in order to change various settings associated with the virtual camera. For example, the indicators may enable the user to change the focus, crop-factor, f-stop, and/or lens type of the virtual camera. Illustratively, user 206 may select an icon to change the lens of the virtual camera from 50 mm to 120 mm. As such, the image frames displayed to the user may exhibit the features of a 120 mm lens, including any lens distortion effects, zoom, etc. As another example, the user may select a focus indicator. Upon selecting the focus indicator, the user may select various objects or parts of the VR environment by contacting his or her finger to the location of the object or part as displayed on the screen of the computing device 102. The position information for the user's finger may be transmitted by the computing device 102 to the server 108. The server 108, in turn, may generate or "shoot" one or more virtual, invisible rays from the current position of the virtual camera into the VR environment based on the position information. Upon detecting an intersection of the one or more rays with a virtual object or part of the VR environment, the server 108 can determine that the intersecting object and/or part should be placed in focus. Accordingly, the VR environment is rendered with the object/part placed in focus. Furthermore, depending on the virtual distance of other objects in the VR environment relative to the in-focus object (and the selected lens type/f-stop), the server 108 applies varying degrees of focus to the other objects. For example, an object far away from the selected in-focus object in the VR environment may be rendered with a slight blur. In some instances, the amount of blur applied to an object may increase as the object is further away from the in-focus object in the VR environment.

The user 206 may interact with the displayed indicators in any suitable manner in order to perform a change to the settings of the virtual camera. In some embodiments, the user 206 may first select the indicator associated with the setting to be changed by tapping on the indicator. Thereafter, the user 206 may perform one or more gestures to change the settings associated with the selected indicator. For example, after selecting the f-stop indicator, the user 206 may increase the f-stop by performing a swipe gesture to the right. The user 206 may decrease the f-stop by performing a swipe gesture to left. Additionally, after selecting the lens type indicator, the user 206 may select lens with progressively higher zoom by performing swipe gestures to the right. The user 206 may select lens with progressively less zoom (or wider angle) by performing swipe gestures to the left.

In some embodiments, rather than specifically selecting an indicator, the user 206 may use different gestures to determine which lens setting/parameter to change. For example, swiping horizontally with a three fingers on the touchscreen of the computing device may change the f-stop. Swiping horizontally on the screen with four fingers may cause a change in the lens type. Double tapping on the location of an object on the touchscreen of the computing device may focus the virtual camera on the object. Examples of finger gestures illustrated in FIG. 4 may be used to enable the user 206 to perform these lens operations. For example, without limitation, user 206 may be enabled to switch a lens type of the virtual camera to another lens type by providing a rotating gesture to the touch sensitive surface of the computing device 102. It should be understood, the examples given in FIG. 4 with respect to finger gestures that may be provided by user 206 for performing the lens operation are merely illustrative and not intended to be limiting. One of ordinary skill in the art will appreciate other like finger gestures similar to those shown in FIG. 4 can be used to facilitate user 206 to perform lens operations.

In another aspect, the user interface of the computing device 102 may enable the user 206 to select a particular "crop factor" or "aspect ratio" to be applied to the image frames shown to the user 206 to simulate different movie or cinematic formats. In one embodiment, the cropped out area may be completely opaque. In other embodiments, the cropped out area may be semi-translucent such that the portions of the VR environment in the cropped out area can be partially seen. In certain embodiments, the degree of transparency of the cropped out area may be changed by the user 206. For example, the user 206 may indicate a 25%, 50%, or 75% degree of transparency. In this way, a director can understand what parts of the VR environment may be left out in a finally completed item of content. For example, without limitation, user 206 may be enabled to switch an aspect ratio to another aspect ratio of the virtual camera by providing a reverse pinch gesture to the touch sensitive surface of the computing device 102. It should be understood, the examples given in FIG. 4 with respect to finger gestures that may be provided by user 206 for performing the aspect ratio operation are merely illustrative and not intended to be limiting. One of ordinary skill in the art will appreciate other like finger gestures similar to those shown in FIG. 4 can be used to facilitate user 206 to perform aspect ratio operations.

In some examples, as the user 206 is moving the virtual camera around the VR environment, he or she may indicate to the computing device 102 to save a "bookmark" of the virtual camera's current location, orientation, and any associated parameters. In effect, the bookmark saves a shot taken from the virtual camera using specific camera parameters. In some embodiments, the user interface provided by the computing device may additionally enable the user 206 to annotate or include notes for the bookmark. For example, the user 206 can provide an overall annotation or annotations for the bookmark. As another example, the user 206 can select different areas of the bookmarked shot and place separate annotations at those areas. In some embodiments, the user 206 may also attach a rating to the bookmark. The bookmarks may be sorted according to the rating when later accessed as described below. For example, without limitation, user 206 may be enabled to activate an annotation mode by providing two finger press to the touch sensitive surface of the computing device 102 such that user 206 may provide text, audio and/or video annotation about the VR environment once the annotation mode is activate. As another example, without limitation, user 206 may be enabled to bookmark an object in the VR environment by providing two taps to the touch sensitive surface of the computing device 102. It should be understood, the examples given in FIG. 4 with respect to finger gestures that may be provided by user 206 for performing the annotation/bookmark operation(s) are merely illustrative and not intended to be limiting. One of ordinary skill in the art will appreciate other like finger gestures similar to those shown in FIG. 4 can be used to facilitate user 206 to perform annotation/bookmark operation(s).

In one aspect, the generated bookmarks and any annotations may later be used to re-load the VR environment from the perspective of the virtual camera with the associated parameters by the server 108 and/or content creation system. When re-loaded by the server 108, the virtual camera is placed at the position and orientation indicated by the bookmark with any associated camera parameters. Thereafter, the user 206 can begin moving and/or interacting with the virtual camera from the position in the VR environment. Discussion of re-loading the bookmark into the content creation system is discussed below. In some embodiments, any previously generated bookmarks may be presented in a list sorted by rating and/or by most recent modification. In certain embodiments, the bookmarks presented to user 206 may have been created by several different other users across several different VR environments. The user 206 may organize such bookmarks into a playlist in which each shot is present to the user 206 in the order of the playlist.

As should be clear, the computing device 102 may be, for example, a smartphone, tablet, or any other device configured to include sensors or sensing mechanisms (e.g., infrared reflective targets). For example, the computing device 102 may be a device that includes one or more buttons and a set of infrared reflective targets. The buttons may allow the computing device 102 to send command signals to the server 108 in order to perform various functions. The infrared reflective targets may allow sensors of the motion capture system to track the position of the computing device 102 at any given time.

In one aspect, the server 108 may map the physical orientation/position of the computing device 102 with a physical orientation/position of a virtual selection element in the VR environment. Such mapping can be performed in any suitable manner. For example, the server 108 may map the initial GPS coordinates, accelerometer information, and other sensor information received from the computing device 102 to an initial virtual position or orientation of the virtual selection element. As another example, the sensors of the motion capture system may determine the initial location of the computing device 102 by detecting the infrared reflective markers on the computing device 102. The initial location may be mapped to an initial virtual position or orientation of the virtual selection element. As will be described below, any change in the initial physical orientation/position of the computing device 102 may cause movement of the virtual selection element in the VR environment.

In one embodiment, the virtual selection element may be represented by one or more visible rays or beams cast or emanating from the position of a virtual camera of the VR environment. In some instances, the one or more rays may terminate or end once intersecting with or "hitting" the surface of an object in the VR environment. The intersecting object may be considered to be currently "selected" by the representative system. In certain embodiments, the end or terminus of the virtual selection element may be represented by and/or include a target or "bulls-eye." The virtual selection element may also be associated with one or more displayed attributes for the surface with which it currently intersects. The attribute information may include information regarding the material of the surface, the density of the surface, the texture of the surface, the color of the surface, the virtual distance of the surface from the virtual camera of the VR environment, etc. In some instances, user 206 may interact with the computing device 102 to change the attributes of the surface in real-time or at interactive frame rates. For example, user 206 may interact with the computing device 102 to change the attribute of the intersecting/selected virtual surface from a "wood" material to a "metal" material. Upon changing a surface from a wood material to a metal material, images of the virtual surface displayed to the user 206 may be updated at interactive frames rates (e.g., 30, 60, 90, or 120 frames per second) accordingly to include a silver, shiny surface.

In some instances, the user 206 may interact with the computing device 102 to choose a virtual object to be placed on a selected surface. For example, user 206 may enter into an object placement menu or use predefined hotkeys to select and place a virtual tree or building on a surface currently selected by the virtual selection element. In some instances, the user 206 may move or remove a virtual object from the VR environment. For example, user 206 may select a virtual tree using the virtual section element and move the virtual tree to another location in the VR environment by physically moving the computing device 102 (as described and illustrated herein).

In some instances the virtual objects of the VR environment may move or interact with other objects over time. In one aspect, the movement or interaction of the virtual objects may have been pre-rendered and/or pre-defined such that the virtual objects can be presented in very high fidelity. In other aspects, the movement and/or interactions of the virtual objects may be rendered in real-time.

In some instances, user 206 may move the virtual selection element by physically moving the computing device 102 in the real world environment. As mentioned, the physical orientation of the computing device 102 may be mapped to the orientation of the virtual selection element in the VR environment. Thus, if the computing device 102 moves three feet to the right in the physical world, the virtual selection element may also move three virtual feet to the right in the virtual world. In this way, user 206 can quickly select different objects within the VR environment and determine the attributes of the objects. User 206 can also quickly add, remove, or move objects around the VR environment.

Figure 12A:
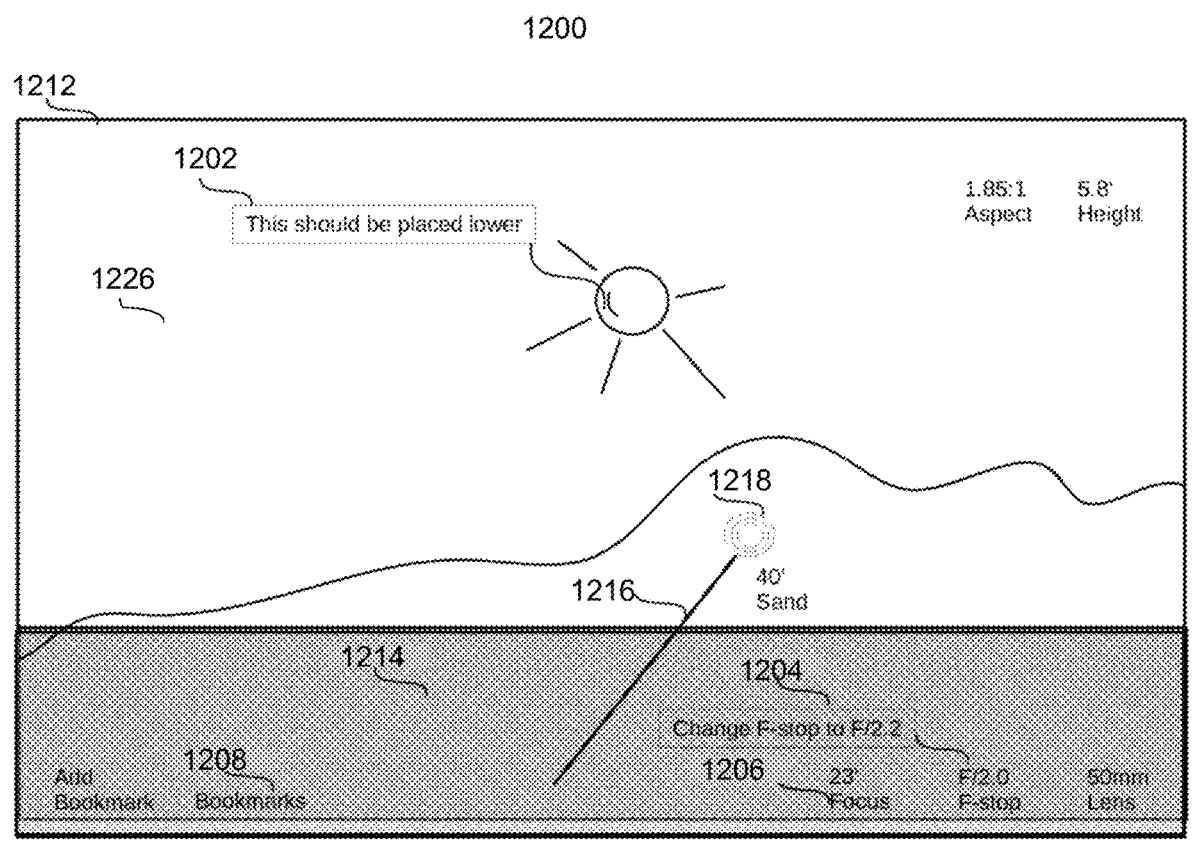
FIG. 12A illustrates an example user interface for generating content based on a VR environment facilitated by the system shown in FIG. 1.

FIG. 12a shows an example user interface 1200 showing a view 1212 of VR taken by a virtual camera controlled by a computing device, such as the computing device 102. The view 1212 can be displayed on an interactive device shown in FIG. 1, such as the computing device 102 or HMD 104. In particular, FIG. 12a includes the indicator 1206 showing the current focus distance value. FIG. 12a also includes the indicator 1208 with which a user can interact in order to access any previously saved bookmarks. FIG. 12a further shows the annotations 1204 and 1202 that are associated with the particular shot. It should also be appreciated that the image frames presented to the user include cropped out areas 1226 and 1214. FIG. 12a further shows a virtual selection element 1216. The virtual selection element 116 includes a ray portion that is cast out from the virtual camera and a target element 1218 indicating the surface with which the virtual selection element 1216 first intersects. In some embodiments, the virtual selection element 1216 may only terminate at a surface that is of a particular type. For example, the virtual selection element 1216 may not end (or be considered to intersect) with surfaces that have a less than a threshold density or are defined as having a gaseous or liquid type. For instance, the virtual selection element 1216 may not end (or be considered to intersect) a virtual cloud since the virtual cloud may not meet a predefined threshold density. Referring again to FIG. 12a, the virtual selection element 1216 is further associated with attribute information for a currently selected surface. In particular, the attribute information indicates that the selected surface (the surface of a dune) is 40 feet away and has a "sand" material type.

Figure 12B:
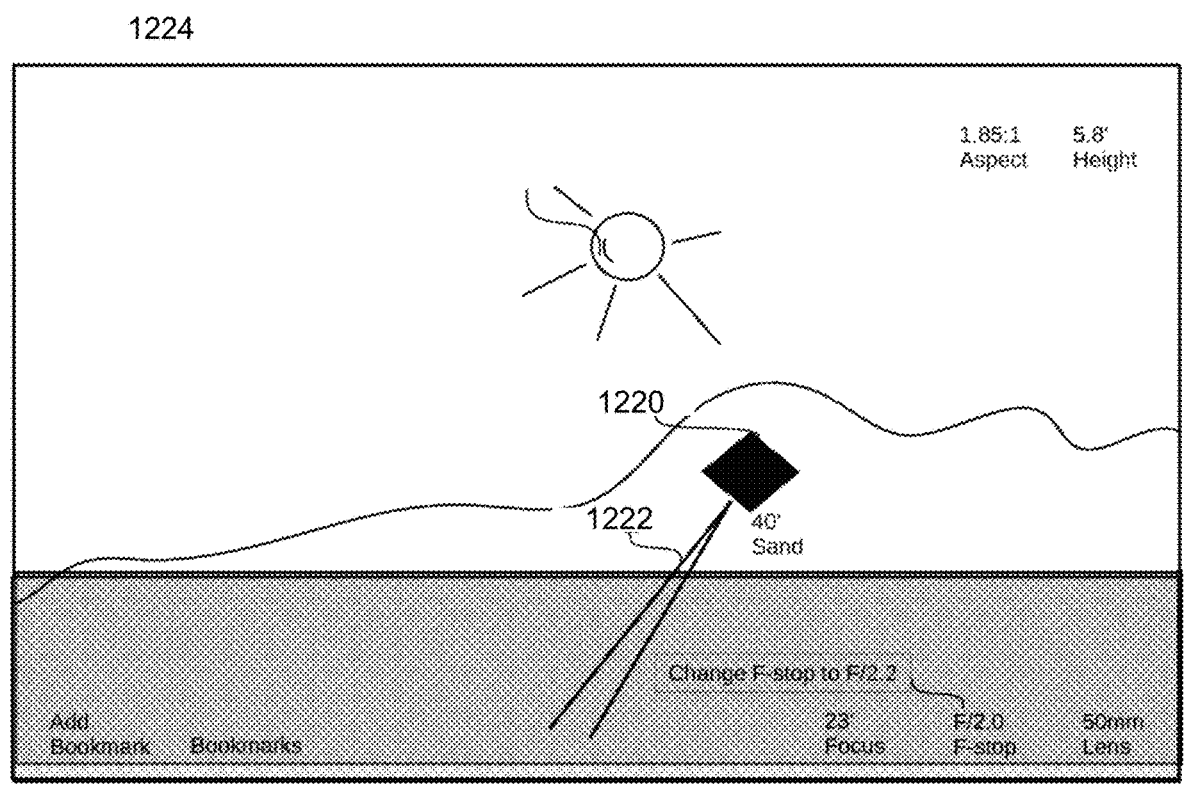
FIG. 12B illustrates another example user interface for generating content based on a VR environment facilitated by the system shown in FIG. 1.

FIG. 12b shows an example user interface 1224 similar to that shown in FIG. 12a. FIG. 12b shows a virtual selection element 1222 with multiple rays. At the end of the rays is an object 1220 that will be placed on the surface that currently intersects with the virtual selection element 1222.

Returning to FIG. 2, in some embodiments, the user can use the computing device 102 to change the scale of the virtual camera. For example, the user can change the scale of the virtual camera such that the VR environment can appear very large. Put another way, the user can shrink the virtual camera such that it appears the user is an insect within the VR environment. In this way, the user can examine detailed aspects of the environment. As another example, the user can change the scale of the virtual camera such that the VR environment appears very small. Put another way, the user can enlarge the virtual camera such that it appears that the user is a giant within the VR environment. In this way, the user can easily examine the entirety of the VR environment. In one embodiment, the user can navigate the VR environment according to or based on the camera's virtual size. For example, "smaller" virtual cameras 1104 may move slower or have smaller "steps" across the virtual environment. "Larger" virtual camera may move faster or have "larger steps" across the same virtual environment.

In another embodiment, the user 206 may use computing device 102 (e.g., smartphone, tablet, device with infrared reflective markers, etc.) to select various objects within the VR environment by pointing the computing device 102 at various points of the projection device(s) displaying the virtual environment. The user 206 may further use the computing device 102 to place various objects within the VR environment.

In one embodiment, the bookmarks created by the user 206 may be exported or otherwise provided to the content creation system. An artist operating the content creation system may select the bookmarks (which may be sorted by rating) in order to load a virtual camera in the VR environment from a position and orientation indicated by the bookmark. The virtual camera may also be loaded with a lens type, focus, crop-factor, and/or f-stop indicated by the bookmark. In this way, the artist can easily begin processing a scene in order to generate an item of content.

In one embodiment, the HMD 104 (if it is a pair of VR glasses or goggles, for example), may present a split screen to a user. One side of the screen may display video of the physical environment as captured by a front facing camera associated with the second mobile device. The other side may show the virtual environment. In this way, the user can simultaneously view the virtual environment while being able to also avoid obstacles in the physical environment as the user moves. In another embodiment, a picture-in-picture organization may be used rather than a split screen. For example, the primary screen may display the virtual environment. A smaller secondary screen may be overlaid on the primary screen and show the physical environment In one aspect, the HMD 104 may be a set of virtual reality goggles. In the aspect, the user may switch to an "immersive" mode during a session. As such, the server 108 may begin sending rendered image frames of the VR environment to the HMD 104 and cease sending rendered image frames to the computing device 102. The server 108 may also change the format of the image frames that it renders so that it can be properly displayed by the HMD 104. In one aspect, the computing device 102 may still be used to control the virtual camera. For example, the user 206 may use any number of gestures to move the virtual camera via the computing device 102 while viewing the image frames of the VR environment from the HMD 104. Note, in that example, that no images may be presented over the display (e.g., touchscreen) of the computing device 102. In some embodiments, the user 206 may briefly tap on the input device (e.g., touchscreen) of the computing device 102. In response to the tap, an indicator may be quickly presented or "flashed" in the image frames of the VR environment presented via the display of the HMD 104. The indicator or "flash" may indicate the portion of the VR environment corresponding to the to the portion of the input device of the first mobile device tapped by the user. In this way, the user is able to quickly determine the mapping between the computing device 102's input device and the HMD 104's display.

In yet another aspect, a device of an assisting operator may be used to control the virtual camera shown via the HMD 104 (or computing device 102) to the user. The device of the assisting operator may include a smartphone, a tablet, a laptop, a smart TV, a projection system or any other device. For example, without limitation, the assisting operator's device may display an overhead or map view of the VR environment. The assisting operator may interact with his/her device to move the virtual camera to different locations within the VR environment by providing finger gestures to his/her device in a manner as described herein for controlling the virtual camera. As such, the perspective of the VR environment shown to the user 206 on the computing device 102 and/or HMD 104 may be changed based on the input provided through assisting operator's device.

In some examples, an assisting operator may be enabled to control the views of the VR environment displayed for multiple users. For example, in one situation, the assisting operator may include a lecturer, and the VR environment may include a scene of a historical event. In that example, the assisting operator, the lecturer, may be enabled to control the views of the VR environment, the historical scene, displayed on the HMDs 104 of students to show the students different visual perspectives of the historical scene, e.g., from different characters in such a scene. In another example, the assisting operator may include a psychiatrist and the VR environment may include high-rise buildings. In that examples, the psychiatrist may be enabled to control the views of the VR environment, e.g., from ground level to certain height level of a high-rise building from a perspective of someone standing at that high level looking down. Such views of the VR environment may be displayed to a group of patients with height phobia (e.g., vertigo) on their HMD 104 to help them overcome the phobia. Other examples are contemplated.

Figure 10:
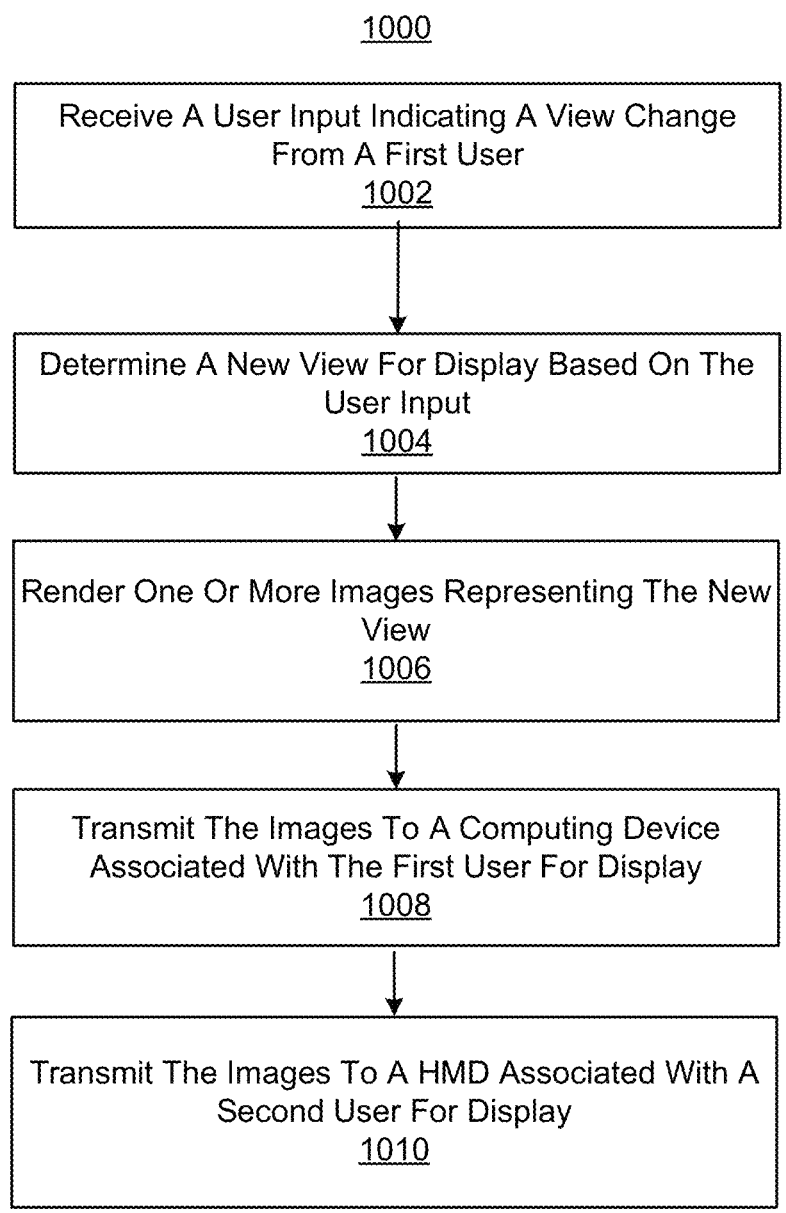
FIG. 10 illustrates an example of a process for presenting a menu of items for user selections in a view of an VR environment based on user inputs.

FIG. 10 illustrates an example of a process 1000 for presenting a menu of items for user selections in a view of an VR environment based on user inputs. Process 1000 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 can be performed under the control of one or more computer systems configured with executable instructions and can be implemented as code (e.g., executable instructions, one or more computer programs, or one or more applications) executing collectively on one or more processors, by hardware, or combinations thereof. The code can be stored on a computer-readable storage medium, for example, in the form of a computer program comprising a plurality of instructions executable by one or more processors. The computer-readable storage medium can be non-transitory.

In some aspects, the process 1000 can be performed by one or more of a server, such as server 108 described and illustrated herein.

At 1002, a user input indicating a view change can be received from a first user. In some examples, the user input can be received from a computing device 102 associated with the first user. The user input received at 1002 may indicate a view change request to change a currently displayed view to a new view at a new location specified by the received user input. In some examples, 1002 can be performed by an input component the same as or substantially similar to input component 502 described and illustrated herein.

At 1004, a new view for display can be determined based on the user input received at 1002. In some examples, 1004 can be performed by a view determination component the same as or substantially similar to view determination component 508 described and illustrated herein.

At 1006, one or more images representing the new view can be rendered. In some examples, 1006 can be performed by a render component the same as or substantially similar to view render component 510 described and illustrated herein.

At 1008, the rendered images can be transmitted to a computing device associated with the first user for display. In some examples, 1008 can be performed by a render component the same as or substantially similar to view render component 510 described and illustrated herein.

At 1010, the rendered images can be transmitted to a HMD associated with a second user for display. In some examples, 1008 can be performed by a render component the same as or substantially similar to view render component 510 described and illustrated herein.

Figure 11:
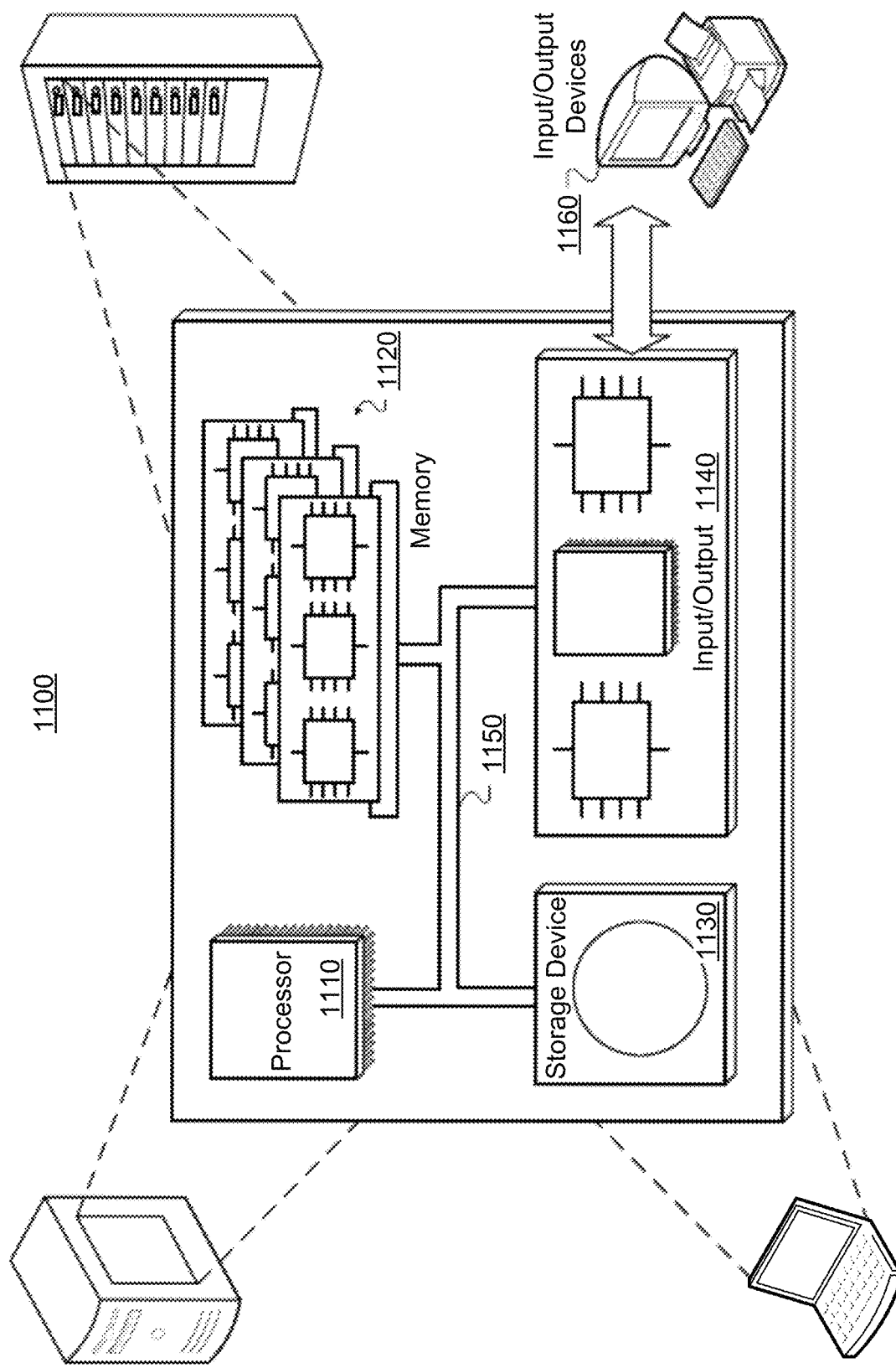
FIG. 11 is a schematic diagram is shown of an example of a computer system.

Referring to FIG. 11, a schematic diagram is shown of an example of a computer system 1100. This system is exemplary only and one having skill in the art will recognize that variations and modifications are possible. The system 1100 can be used for the operations described above. For example, the computer systems shown in FIG. 11 can be used to implement any or all of the initialization (e.g., face annotation, skull fitting, constraint creation) and stabilization (e.g., skin energy or error determination, nose energy or error determination) techniques and routines described herein.

The system 1100 includes a processor 1110, a memory 1120, a storage device 1130, and an input/output interface 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to provide graphical information via input/output interface 1140 for display on a user interface of one or more input/output device 1160.

The memory 1120 stores information within the system 1100 and can be associated with various characteristics and implementations. For example, the memory 1120 may include various types of computer-readable medium such as volatile memory, a non-volatile memory and other types of memory technology, individually or in combination.

The storage device 1130 is capable of providing mass storage for the system 1100. In one implementation, the storage device 1130 is a computer-readable medium. In various different implementations, the storage device 1130 can be a floppy disk device, a hard disk device, an optical disk device, or a tape device.

The input/output device 1160 provides input/output operations for the system 1100. In one implementation, the input/output device 1160 includes a keyboard and/or pointing device. In another implementation, the input/output device 1160 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification can be made without departing from the scope of the invention.

The specification and drawings are, accordingly, to be regarded in an illustrative rather than a restrictive sense. It will, however, be evident that additions, subtractions, deletions, and other modifications and changes can be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method for facilitating a user to manipulate a view of a virtual environment, the method comprising:
    receiving, by a server, a sensor input indicating movement of a mobile display device associated with a user, the sensor input corresponding to a navigation command for controlling navigation within the virtual environment;
    determining, by the server, based on the sensor input, a first location within the virtual environment where a first view of a virtual reality environment is taken;
    determining, by the server, a second location within the virtual environment associated with a second user where a second view of a virtual reality environment is taken;
    rendering, by the server, one or more images representing the first view of the virtual environment corresponding to the first location;
    receiving a first user input over a network, by the server, from a portable device having a touch sensitive surface, the portable device being associated with the user, wherein the first user input is provided by the user to manipulate the first view of the virtual environment, and the first user input includes one or more first finger gestures;
    mapping, by the server, the first user input to a first command for manipulating the first view of the virtual environment;
    based on the first view and the first command, determining, by the server, a third view of the virtual environment, wherein the third view is taken at a third location in the virtual environment, wherein the third location is distinct from the first location, and the second location;
    receiving a second user input over the network, by the server, from the portable device having the touch sensitive surface the second user input includes one or more second finger gestures that are different from the one or more first finger gestures; and
    rendering, by the server, one or more images representing the second view of the virtual environment, wherein the one or more images representing the first view of the virtual environment changes to the one or more images representing the third view of the virtual environment instantly in response to the first user input.

2. The computer-implemented method of claim 1, wherein the sensor input indicates user position change within an area.

3. The computer-implemented method of claim 1, wherein the determining the first location further comprises determining at least one of a size of a field of view, a zoom ratio of the first view, or a lens type for presenting the first view.

4. The computer-implemented method of claim 1, wherein the one or more first finger gestures includes at least one of a multi-finger touch, a reverse pinch, or a rotational finger movement.

5. The computer-implemented method of claim 1, further comprising transmitting the one or more images of the first view to a head-mounted display for presentation.

6. The computer-implemented method of claim 1, further comprising transmitting the one or more images of the second view to a head-mounted display for presentation.

7. The computer-implemented method of claim 1, wherein the one or more second finger gestures comprises a press gesture on the touch sensitive surface.

8. The computer-implemented method of claim 1, wherein the server establishes a secure connection with each network device using a protocol comprising at least one of a Session Traversal Utilities for NAT (STUN), a Traversal Using Relay NAT (TURN), an Interactive Connectivity Establishment (ICE), a combination thereof, or any other NAT traversal protocol.

9. A server for facilitating a user to manipulate a view of virtual environment, the server comprising:
    one or more displays;
    one or more processors connected to the one or more displays, wherein the one or more processors are configured to:
        receive, by a server, a sensor input indicating movement of a mobile display device associated with a user, the sensor input corresponding to a navigation command for controlling navigation within the virtual environment;
        determine, by the server, based on the sensor input, a first location within the virtual environment where a first view of a virtual reality environment is taken;
        determine, by the server, a second location within the virtual environment associated with a second user where a second view of a virtual reality environment is taken;
        render, by the server, one or more images representing the first view of the virtual environment corresponding to the first location;
        receive a first user input over a network, by the server, from a portable device having a touch sensitive surface, the portable device being associated with the user, wherein the first user input is provided by the user to manipulate the first view of the virtual environment, and the first user input includes one or more first finger gestures;

map, by the server, the first user input to a first command for manipulating the first view of the virtual environment;

based on the first view and the first command, determine, by the server, a third view of the virtual environment, wherein the third view is taken at a third location in the virtual environment, wherein the third location is distinct from the first location and the second location;

receive a second user input over the network, by the server, from the portable device having the touch sensitive surface the second user input includes one or more second finger gestures that are different from the one or more first finger gestures; and render, by the server, one or more images representing the second view of the virtual environment, wherein the one or more images representing the first view of the virtual environment changes to the one or more images representing the third view of the virtual environment instantly in response to the first user input.

10. The server of claim 9, wherein the sensor input indicates user position change within an area.

11. The server of claim 9, wherein the determining the first location further comprises determining at least one of a size of a field of view, a zoom ratio of the first view, or a lens type for presenting the first view.

12. The server of claim 9, wherein the one or more first finger gestures includes at least one of a multi-finger touch, a reverse pinch, or a rotational finger movement.

13. The server of claim 9, wherein the one or more processors are further configured to transmit the one or more images of the first view to a head-mounted display for presentation.

14. The server of claim 9, wherein the one or more processors are further configured to transmit the one or more images of the second view to a head-mounted display for presentation.

15. The server of claim 9, wherein the one or more second finger gestures comprises a press gesture on the touch sensitive surface.

16. A non-transitory computer-readable medium storing a plurality of instructions executable by one or more processors of a computing device of a server, the plurality of instructions comprising:

instructions that cause the one or more processors to receive a sensor input indicating movement of a mobile display device associated with a user, the sensor input corresponding to a navigation command for controlling navigation within a virtual environment;

instructions that cause the one or more processors to determine based on the sensor input, a first location within the virtual environment where a first view of a virtual reality environment is taken;

instructions that cause the one or more processors to determine, by the server, a second location within the virtual environment associated with a second user where a second view of a virtual reality environment is taken;

instructions that cause the one or more processors to render one or more images representing the first view of the virtual environment corresponding to the first location;

instructions that cause the one or more processors to receive a first user input over a network from a portable device having a touch sensitive surface, the portable device being associated with the user, wherein the first user input is provided by the user to manipulate the first view of the virtual environment, and the first user input includes one or more first finger gestures;

instructions that cause the one or more processors to map the first user input to a first command for manipulating the first view of the virtual environment;

instructions that cause the one or more processors to determine, based on the first view and the first command, a third view of the virtual environment, wherein the third view is taken at a third location in the virtual environment, wherein the third location is distinct from the first location and the second location;

receive a second user input over the network, by the server, from the portable device having the touch sensitive surface the second user input includes one or more second finger gestures that are different from the one or more first finger gestures; and instructions that cause the one or more processors to render one or more images representing the second view of the virtual environment, wherein the one or more images representing the first view of the virtual environment changes to the one or more images representing the third view of the virtual environment instantly in response to the first user input.

17. The non-transitory computer-readable medium of claim 16, wherein the sensor input indicates user position change within an area.

18. The non-transitory computer-readable medium of claim 16, wherein the determining the first location further comprises determining at least one of a size of a field of view, a zoom ratio of the first view, or a lens type for presenting the first view.

19. The non-transitory computer-readable medium of claim 16, wherein the one or more first finger gestures includes at least one of a multi-finger touch, a reverse pinch, or a rotational finger movement.

20. The non-transitory computer-readable medium of claim 16, further comprising instructions that cause the one or more processors to transmit the one or more images of the first view to a head-mounted display for presentation.

21. The non-transitory computer-readable medium of claim 16, wherein the second one or more finger gestures comprises a press gesture on the touch sensitive surface.

* * * * *